United States Patent
Inagaki et al.

(10) Patent No.: US 6,758,693 B2
(45) Date of Patent: Jul. 6, 2004

(54) OPTICAL ACTIVE CONNECTOR PLUG FOR LAN AND ITS CONNECTOR PORT

(75) Inventors: Shuichiro Inagaki, Tokyo (JP); Noboru Iwasaki, Atsugi (JP); Yasuhiro Ando, Nishitokyo (JP); Nobuyuki Tanaka, Atsugi (JP); Mitsuaki Yanagibashi, Mitaka (JP); Nobuo Ishimine, Tokyo (JP); Katsumi Kaizu, Tokyo (JP)

(73) Assignees: NTT Advanced Technology Corporation, Tokyo (JP); Nippon Telegraph and Telephone Corporation, Tokyo (JP)

(*) Notice: Subject to any disclaimer, the term of this patent is extended or adjusted under 35 U.S.C. 154(b) by 16 days.

(21) Appl. No.: 10/168,852

(22) PCT Filed: Nov. 1, 2001

(86) PCT No.: PCT/JP01/09582
§ 371 (c)(1),
(2), (4) Date: Aug. 22, 2002

(87) PCT Pub. No.: WO02/39167
PCT Pub. Date: May 16, 2002

(65) Prior Publication Data
US 2003/0124903 A1 Jul. 3, 2003

(30) Foreign Application Priority Data
Nov. 2, 2000 (JP) .................... 2000-335667
Apr. 20, 2001 (JP) .................... 2001-122082

(51) Int. Cl.[7] ........................... H01R 33/945
(52) U.S. Cl. .............. 439/577; 439/246; 385/139; 385/92; 385/94; 385/88; 385/49; 385/76
(58) Field of Search ................. 439/577, 246; 385/139, 92, 94, 88, 49, 76

(56) References Cited

U.S. PATENT DOCUMENTS

| | | | | |
|---|---|---|---|---|
| 4,869,566 A | * | 9/1989 | Juso et al. | 385/53 |
| 5,479,288 A | * | 12/1995 | Ishizuka et al. | 398/164 |
| 5,791,942 A | * | 8/1998 | Patel | 439/637 |
| 6,124,636 A | * | 9/2000 | Kusamitsu | 257/728 |

FOREIGN PATENT DOCUMENTS

| | | |
|---|---|---|
| JP | 5-114434 A | 5/1993 |
| JP | 10-125831 A | 5/1998 |
| JP | 11-297427 A | 10/1999 |

* cited by examiner

Primary Examiner—Dean A. Reichard
Assistant Examiner—Anton B Harris
(74) Attorney, Agent, or Firm—Birch, Stewart, Kolasch & Birch, LLP

(57) ABSTRACT

LAN device and tools can be connected only by optical fiber cables without providing a space for additional LAN devices and tools and changing an electric connector interface of the LAN devices and tools already established. Heat radiation produced in a connector can be effectively discharged and electromagnetic wave can be prevented from radiating to an exterior of the connector

6 Claims, 25 Drawing Sheets

OPTICAL ACTIVE CONNECTOR PLUG FOR LAN AND ITS CONNECTOR PORT

This application is the national phase under 35 U.S.C. § 371 of PCT International Application No. PCT/JP01/09582 which has an International filing date of Nov. 1, 2001.

FIELD OF THE INVENTION

The present invention relates to an optical active connector plug for local area network (hereinafter, it is referred as "LAN") and its connector port. Particularly, the present invention relates to an optical active connector plug in a type of a modular plug having eight wires and eight wires/contacts (hereinafter, it is referred as "having eight wires/contacts") and its connector port, and specified ones of the four pairs of plug contacts, wherein an optical signal can be transmitted between LAN devices without converting electric interface of the modular plug having eight contacts of the LAN device and means for converting electric signals and optical signals is provided in an inside of a connector case.

BACKGROUND OF THE INVENTION

It has been well known Ethernet type interconnects at speeds of up to 10 Mb/s and Fast Ethernet type interconnects at speeds of up to 100 Mb/s as a signal standard for transmitting signals between LAN devices, that is, between a respective terminal and a respective hub and between a respective patch panel and a hub, in a workstation and a personal computer in a LAN system.

In the LAN system satisfying the above standard, a high speed data transmission cable typically comprising four circuits defined by eight wires arranged in four twisted pairs or coaxial cable are connected between LAN device.

FIG. 2 shows an example of a conventional connection between LAN devices constituting a LAN system. FIG. 2 shows a condition how a terminal of a personal computer (herein after, it is referred as "terminal") is connected to a corresponding hub.

At both ends of the connection, a terminal 201 and a hub 202 are connected by an electric cable of which the both ends has modular plug type electric connectors 203 and 204 having eight wires, respectively, wherein the modular plug type electric connector 203 having eight wires is connected to an electric connector port 271 of the terminal 201 and the modular plug type electric connector 204 having eight wires is connected to an electric connector port (not shown) of the hub 202.

It is necessary for the hub 202 to be supplied from a battery source. Therefore, a power source cord 235 is provided.

Under the condition, electric signals can be transmitted between the terminal and the hub.

However, in the structure as shown in FIG. 2, it is difficult to transmit a signal for a long distance in accordance with characteristics of its electric cable. The maximum transmitting distance would be about 100 m.

For example, in the case of providing a LAN system in an office building, there would be some problems in view of providing a cable arrangement freely if the maximum transmitting distance should be designed within 100 m.

As one of the methods to resolve the above described subject, there is a method for employing an electric signal amplifier called as a repeater at a portion between a terminal and a hub as shown in FIG. 3.

That is, a terminal 301 and a repeater 313 are connected by an electric cable 307 of which each end has modular plug type electric connectors 303 and 305 having eight wires/contacts, respectively. The modular plug type electric connector 303 having eight wires/contacts is inserted into an electric connector port (not shown) of the terminal 301 and the modular plug type electric connector 305 having eight wires/contacts is inserted into an electric connector port (not shown) of the repeater 313.

Likewise, a hub 302 and repeater 313 are connected by an electric cable 308 of which each end has modular plug type electric connectors 304 and 306 having eight wires/contacts, respectively. The modular plug type electric connector 304 having eight wires/contacts is inserted into an electric connector port 372 of the hub 302 and the modular plug type electric connector 306 having eight wires/contacts is inserted into an electric connector port 373 of the repeater 313.

With respect to the hub 302 and the repeater 313, it is necessary to provide an external power source. Therefore, power source cords 335, 330 are provided for the hub 302 and the repeater 313, respectively.

Further, if a signal transmitting distance is long, a repeater is inserted every 100 m in the case of the fast Ethernet signal. In such a case, the repeater is connected in such a manner as described above.

In the structure as shown in FIG. 3, it is necessary to provide a space for an additional repeater. It is a demerit in view of constructing a free-design LAN system.

In the structures as shown in FIG. 2 and FIG. 3, electromagnetic noise occurred in areas such as a factory and other places is apt to be baneful and be influential to an electric cable such that signals cannot be transmitted stably.

On the other hand, in an area such as a hospital, where electromagnetic noise should be shut, noise caused by an electric cable would cause malfunction of medical devices.

To resolve the problem in the LAN system as shown in FIG. 2 and FIG. 3, instead of the repeater (s), a pair of media converters for converting an electric signal and an optical signal are provided between a terminal and a hub. By connecting an optical fiber cable between the pair of the media converters, a signal transmitting distance is remarkably improved.

FIG. 4 shows a LAN connecting condition between a terminal and a hub employing the media converters.

A terminal 401 and a media converter 410 are connected by an electric cable 407 of which each end has modular plug type electric connectors 403 and 405 having eight wires/contacts, respectively. The modular plug type electric connector 403 having eight wires/contacts is inserted into an electric connector port (not shown) of the terminal 401 and the modular plug type electric connector 405 having eight wires/contacts is inserted into an electric connector port 473 of the media converter.

Likewise, a hub 402 and a media converter 411 are connected by an electric cable 408 of which each end has modular plug type electric connectors 404 and 406 having eight wires/contacts, respectively. The modular plug type electric connector 404 having eight wires/contacts is inserted into an electric connector port 472 of the hub 402 and the modular plug type electric connector 406 having eight wires/contacts is inserted in to an electric connector port 474 of the media converter 411.

With respect to the hub 402 and the media converters 410 and 411, it is necessary to provide an external power source.

Therefore, battery source cords 435, 436, and 437 are provided for the hub 402 and the media converters 410 and 411, respectively.

The media converters 410 and 411 are connected by an optical fiber cable 412 of which each end has optical connectors 420 and 421, respectively. The optical connector 420 is inserted into the optical connector port 477 of the media converter 410 and the optical connector 421 is inserted into the optical connector port 478 of the media converter 411.

Under the foregoing structure, an electric signal is transmitted between a terminal and the media converter, an optical signal is transmitted between the two media converters and an electric signal is transmitted between the media converter and the hub. If the length of the electric cable is very short, a signal transmitting distance can be remarkably extended by an optical fiber cable for a long distance.

However, in the structure as shown in FIG. 4, it is necessary to provide a space for an additional media converter. It is a demerit in view of providing a free-designed LAN system.

Regarding a power source, it is necessary to provide a special power source cord for each media converter.

Further, even if the length of an electric cable is very short, a problem caused by electromagnetic noise cannot be resolved.

SUMMARY OF THE INVENTION

To accomplish the above object, the present invention provides a modular plug type optical active connector plug having eight wires/contacts and its connector port with a simple power source, wherein LAN devices are connected by only optical fiber cables without providing a space for an additional LAN device and changing electric connector interface in the LAN devices already established and heat is effectively radiated in an inside of connectors and electromagnetic can be prevented from radiating to an exterior of the connectors.

An optical active connector plug for LAN may comprise an electric connector interface for transmitting/receiving an electric signal, an optical interface capable for transmitting/receiving the electric signal, an optical sub-module capable of converting the electric signal and the optical signal, an electrical circuit capable of driving, amplifying, and identifying the signals and a connector case for installing a wiring board on which the optical sub-module and the electrical circuits are mounted.

An optical active connector plug for LAN may comprise a modular plug type electric connector interface having eight wires/contacts wherein electrode terminals are formed to transmit/receive an electric signal, a receptacle for the optical interface, an optical sub-module having an optical element, the optical sub-module capable for converting the electric signal and an optical signal, an optical connector inserted into the receptacle, an electrical circuit electrically connected to the module, the electrical circuit for driving, amplifying, and identifying the signals and a connector case for installing a wiring board on which the optical sub-module and the electrical circuit are mounted, the wherein the connector case includes a metal piece covering the optical sub-module and a part of the wiring board, connected to a heat radiation via-hole provided on one surface of the wiring board and an uneven surface is partly provided on another surface of the metal piece opposite to the surface.

An optical active connector plug for LAN may comprise a modular plug type electric connector interface having eight wires/contacts wherein electrode terminals are formed to transmit/receive an electric signal, a pigtail for an optical interface, an optical sub-module having an optical element, the optical sub-module capable for converting the electric signal and an optical signal, an electrical circuit electrically connected to the module, the electrical circuit for driving, amplifying, and identifying the signals; and a connector case for installing a wiring board on which the optical sub-module and the electrical circuit are mounted, wherein the connector case includes a metal piece covering the optical sub-module and a part of the wiring board, connected to a heat radiation via-hole provided on one surface of the wiring board and an uneven surf,ace is partly provided on another surface of the metal piece opposite to the surface.

In the optical active connector plug for LAN, the wiring board may include at least one power supply pin of which a front end is protruded from the connector case.

In the optical active connector plug for LAN, battery power is supplied to the electrical circuits through the electrode terminal.

In the active connector plug for LAN, a battery supply element is fixed at a portion surrounding with the connector port and the battery supply pin and the battery supply element are contacted to supply power by adapting the electric interface.

In the optical active connector plug for LAN, the interface is a connector port adapted through a battery supply board and the battery supply pin contacts the battery supply element by adapting the electrical interface to supply power and the battery supply board is mechanically held.

By employing an optical active connector plug in accordance with the present invention, it is unnecessary to provide a space for additional LAN devices and tools. The LAN devices can be connected by only optical fibers without changing an electric connector interface of the LAN devices already established. Heat produced in a connector can be effectively radiated, electromagnetic radiation is prevented from radiating to an exterior of the connector and a supply battery source can be simplified.

DESCRIPTION OF THE PREFERRED EMBODIMENTS

The present invention is described in detail with reference to embodiments as shown in the accompanying drawings. However, the present invention is not limited to these embodiments.

First Embodiment

Figure 1:
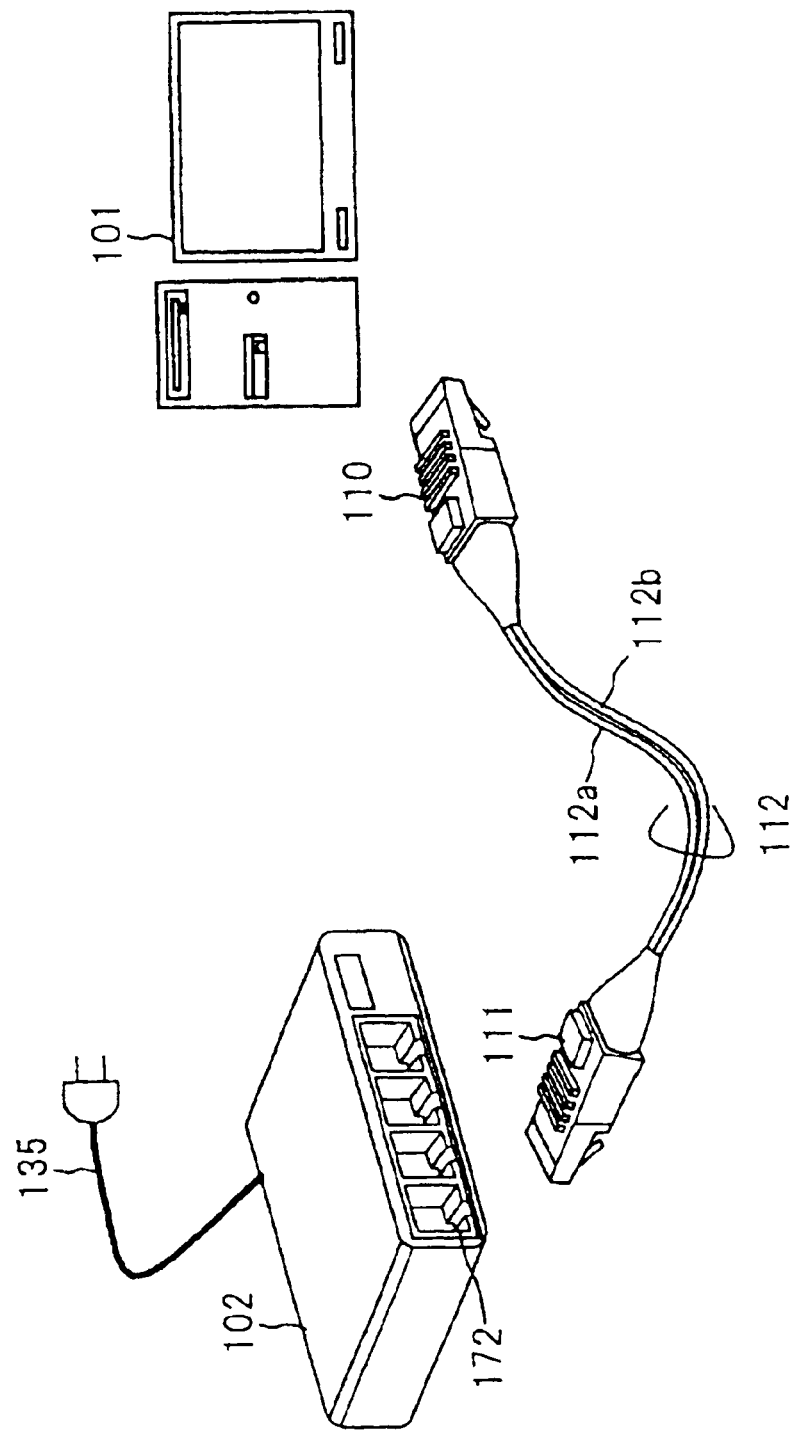
FIG. 1 shows a perspective view according to a first embodiment of the present invention.
Figure 2:
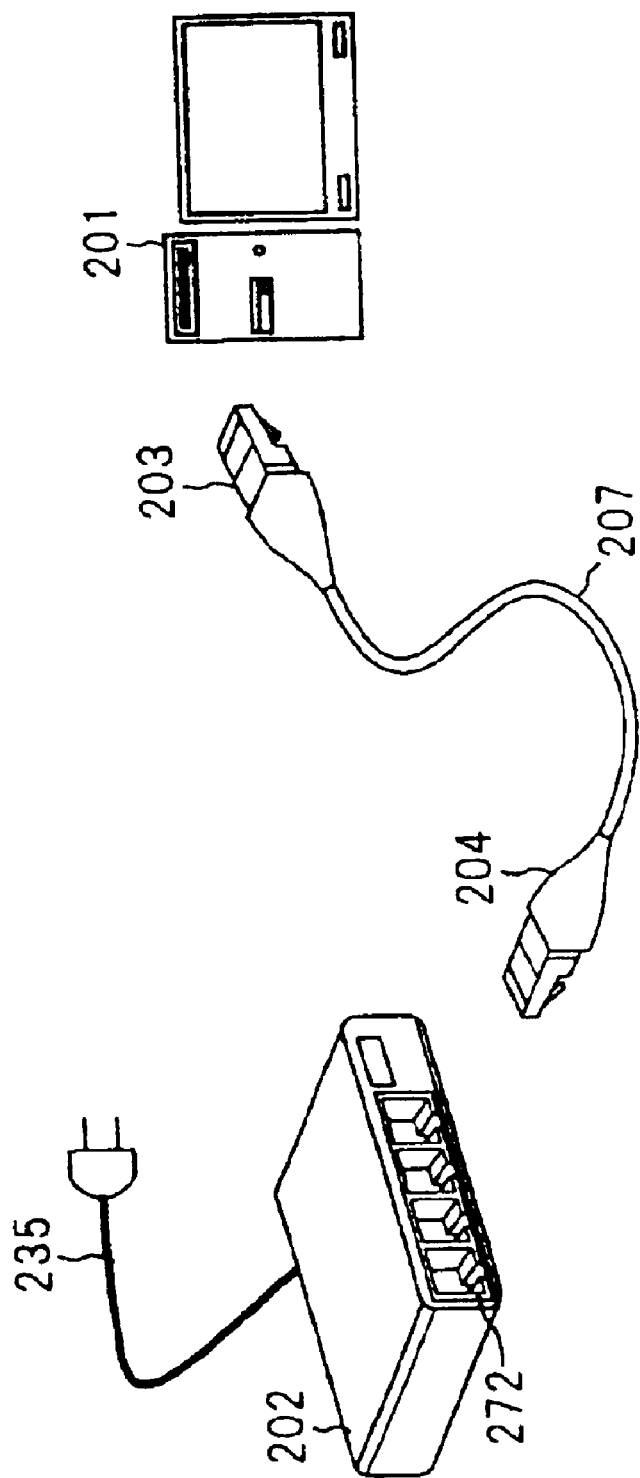
FIG. 2 shows a structure including a conventional electric connector and an electric cable.
Figure 3:
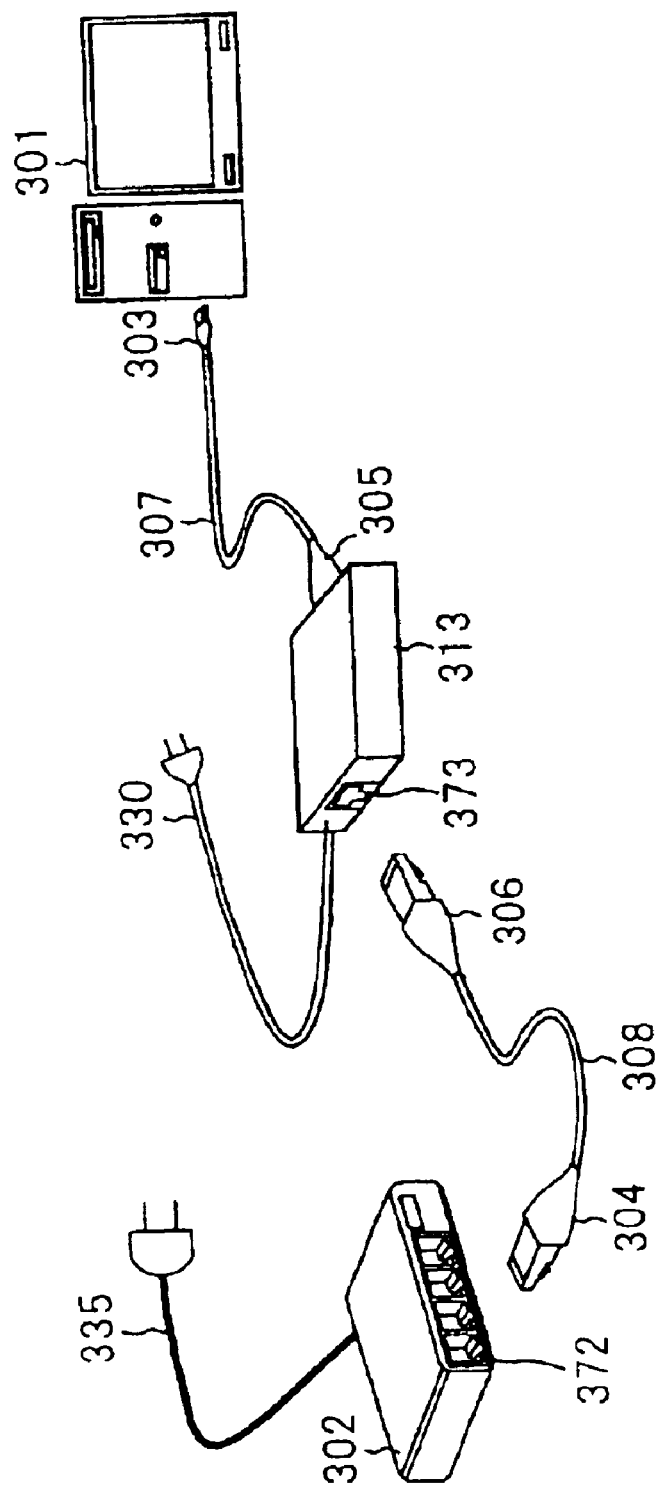
FIG. 3 shows a structure including a conventional electric connector and an electric cable connected through a repeater.
Figure 4:
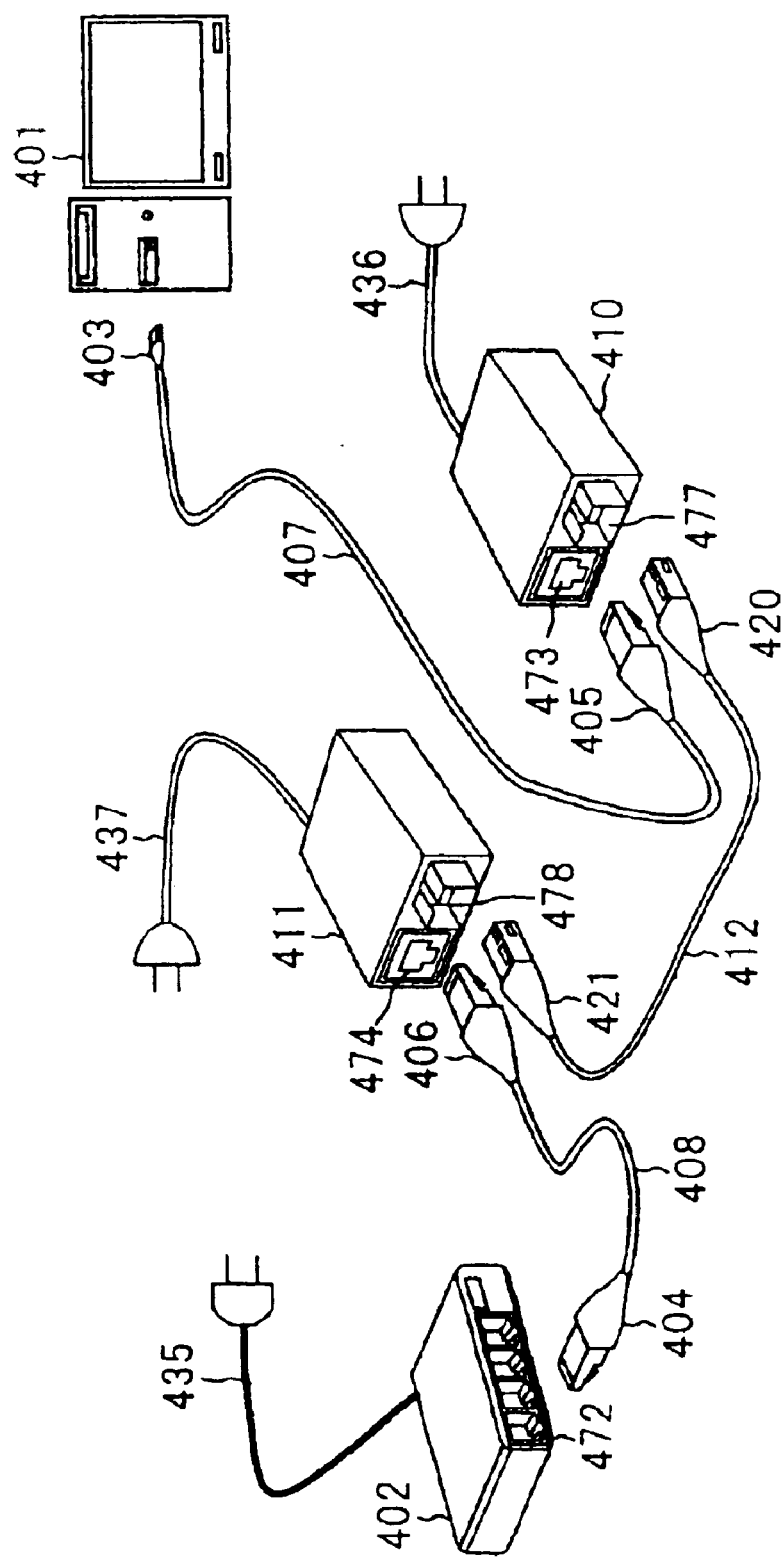
FIG. 4 shows a structure including conventional media converters and an optical fiber.

FIG. 1 shows the first embodiment of the present invention, wherein a terminal and a hub are connected by a modular plug type optical active connector having eight wires/contacts.

A terminal 101 and a hub 102 are connected by a series of modular plug type optical active connectors having eight wires/contacts 110 and 111. The modular plug type optical active connector having the eight wires/contacts 110 is inserted into an electric connector port (not shown) of the terminal 101 and the modular plug type optical active connector 111 having the eight wires/contacts is inserted into an electric connector port 172 of the hub 102.

A two-line optical cable 112 comprises a cable 112a and a cable 112b.

With respect to the hub 102, it is necessary to provide an external power source (external battery source). Therefore, an electric battery source cord 135 is provided.

Under the structure, an electric signal transmitted from the terminal 101 is converted to an optical signal at an optical active connector 110. Such an optical signal is transmitted to the optical active connector 111 through the cable 112a of the two-line optical fiber cable 112. The optical signal is converted to an electric signal again and the electric signal is received at the hub 102.

In the case that an electric signal is transmitted from the hub 102, the electric signal is converted to an optical signal at the optical active connector 111 and transmitted to the optical active connector 110 through the other cable 112b of the two-line optical fiber cable 112. The optical signal is converted to an electric signal again and the electric signal is received at the terminal 101.

Figure 5:
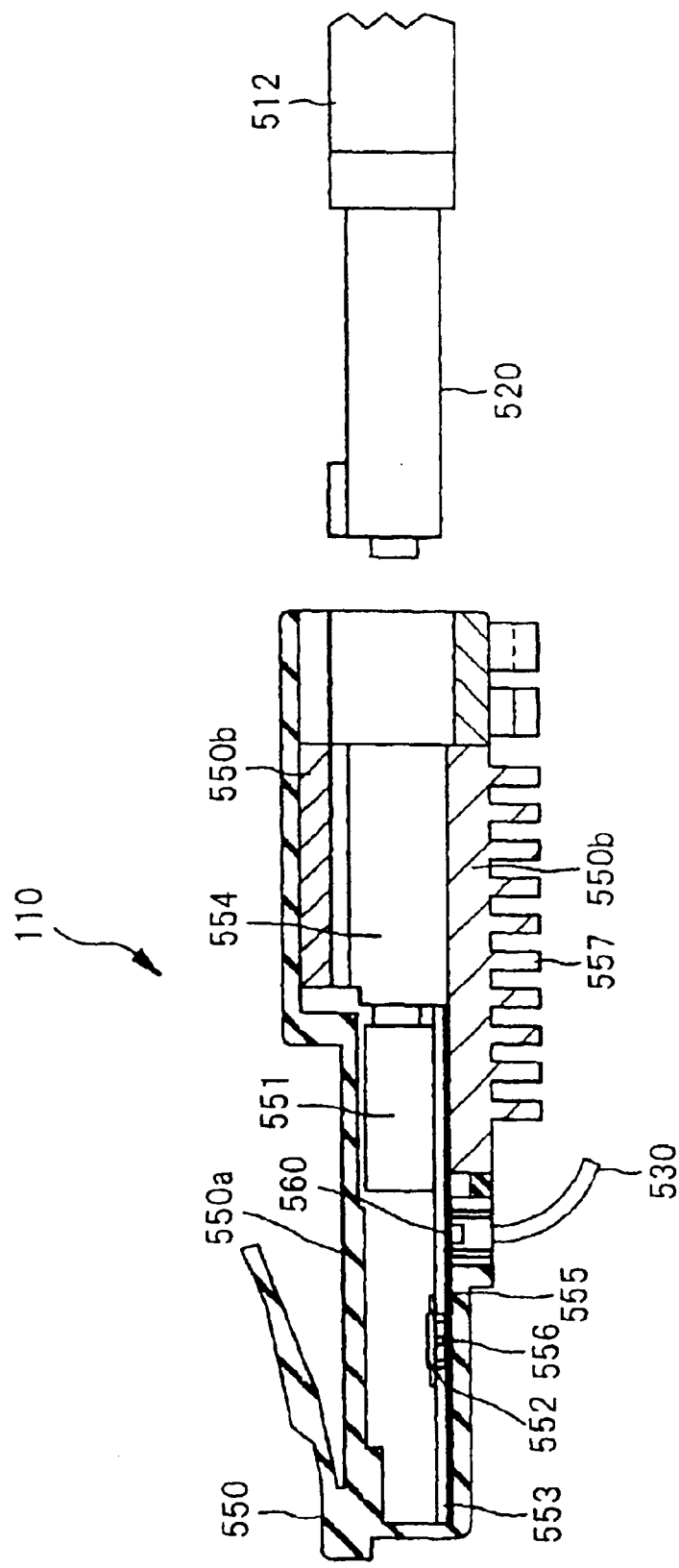
FIG. 5 is a cross-sectional view of a modular plug type optical active connector plug having eight wires/contacts according to the first embodiment of the present invention.

FIG. 5 shows a detailed structure of the optical active connector 110.

The optical active connector 111 has the same structure.

The optical active connector 110 comprises an optical element, an optical sub-module 551 capable of converting an electric signal and an optical signal, electrical circuits 552 electrically connected to the optical sub-module 551 and capable for transmitting, amplifying, and identifying a signal, a wiring board 553 on which resistances and condensers are arranged, and a connector case 550 having a modular plug type electric interface having eight wires/contacts and inside which these elements are installed.

A battery source cord 530 is connected to a load-dispatch pad 560 to supply electric power to the electrical circuits 552.

A receptacle 554 is adapted to the optical sub-module 551 as an optical interface.

In the first embodiment, an optical connector plug 520, connected to each end of the two-line optical fiber cable 512, is inserted into the receptacle 554 of the optical sub-module.

The connector case 550 comprises a metal piece and a plastic piece. The metal connector case 550b covers the optical sub-module 551 having the receptacle 554 and a part of the wiring board 553. By contacting with the wiring board 553 and a grounding member 555 provided at the lowermost layer of the wiring board 553, the grounding member 555 is connected to a radiation via-hole 556 electrically connected in the wiring board 555.

Heat produced at electrical circuits and so on is transmitted to the metal connector case 550b through the heat radiating via-hole 556 and the grounding member 555. Then, heat is radiated to an exterior of the connector through a heat-radiating portion 557.

Simultaneously, the metal connector case 550b prevents electromagnetic wave produced in the connector from radiating to an exterior of the connector. The metal connector case 550b is strong enough to insert the optical connector into the receptacle 554.

Except for the metal connector case 550b, a low-priced plastic connector case 550a is comprised.

Second Embodiment

Figure 6:
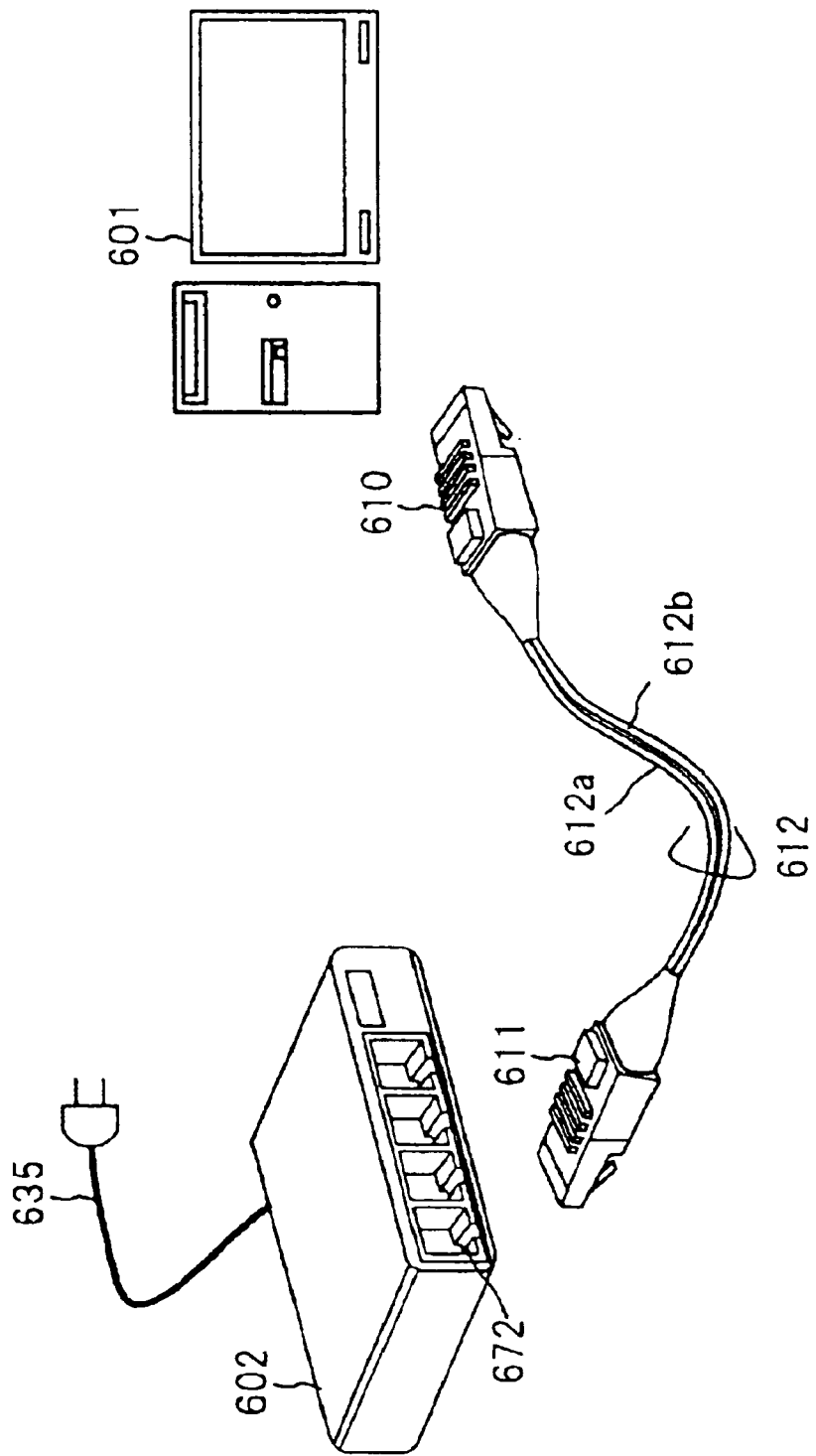
FIG. 6 is a perspective view of a second embodiment of the present invention.

FIG. 6 shows the second embodiment of the present invention, wherein terminal and a hub are connected by a modular type optical active connector having eight wires/contacts.

A terminal 601 and a hub 602 are connected by a series of modular plug type optical active connectors having eight wires/contacts 610 and 611. The modular plug type optical active connector having the eight wires/contacts 610 is inserted into an electric connector port (not shown) of the terminal 601 and the modular plug type optical active connector 611 having the eight wires/contacts is inserted into an electric connector port 672 of the hub 602.

A two-line optical cable 612 comprises a cable 612a and a cable 612b.

With respect to the hub 102, it is necessary to provide an exterior battery source. Therefore, a battery source cord 635 is provided.

Under the above structure, an electric signal transmitted from the terminal 601 is converted to an optical signal at an optical active connector 610. Such an optical signal is transmitted to the optical active connector 611 through the cable 612a of the two-line optical fiber cable 612. The optical signal is converted to an electric signal again and the electric signal is received at the hub 602.

In the case that an electric signal is transmitted from the hub 602, the electric signal is converted to an optical signal at the optical active connector 611 and transmitted to the optical active connector 610 through the other cable 612b of the two-line optical fiber cable 612. The optical signal is converted to an electric signal again and the electric signal is received at the terminal 601.

Figure 7:
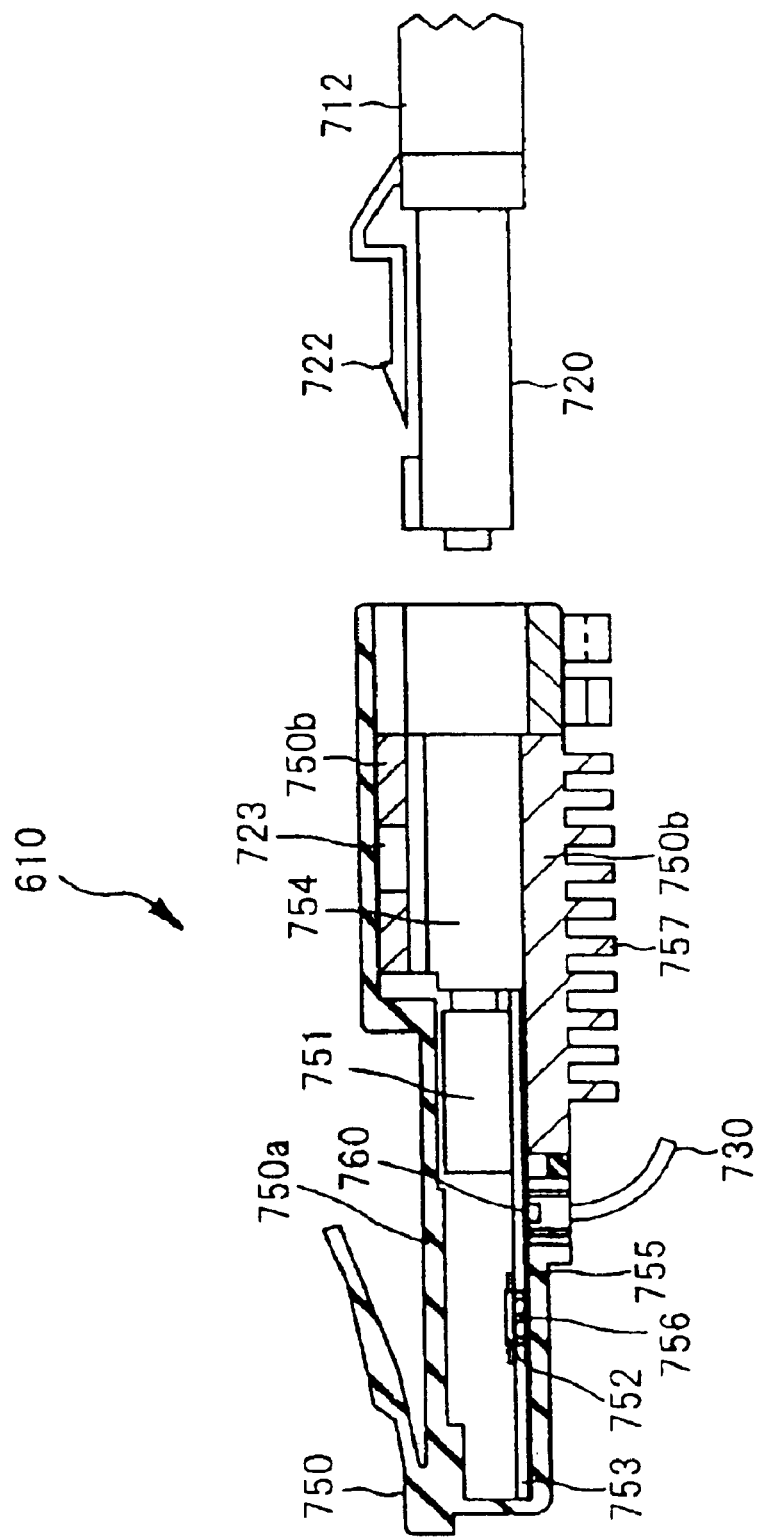
FIG. 7 is a cross-sectional view of a modular plug type optical active connector plug having eight wires/contacts according to the second embodiment of the present invention.

FIG. 7 shows a detailed structure of the optical active connector 610.

A structure of the optical active connector 611 has the same structure.

The optical active connector 610 comprises an optical element, an optical sub-module 751 capable of converting an electric signal and an optical signal, electrical circuits 752 electrically connected to the optical sub-module 751 and capable for transmitting, amplifying, and identifying a signal, a wiring board 753 on which resistances and condensers are arranged, and a connector case 750 having a modular plug type electric interface having eight wires/contacts inside which these elements are installed.

A battery source cord 730 is connected to a load-dispatch pad 760 to supply electric power to the electrical circuits 752.

A receptacle 754 is adapted to the optical sub-module 751 as an optical interface.

In the second embodiment, an optical interface is MT-RJ type, and the MT-RJ type optical connector plug 720 is adapted to each end of the two-line optical fiber cable 712 to be inserted into a receptacle 754 of the optical sub-module.

The connector case 750 comprises a metal piece and a plastic piece. The metal connector case 750b covers the optical sub-module 751 having the receptacle 754 and a part of the wiring board 753. By contacting with the wiring board 753 and a grounding member 755 provided at the lowermost layer of the wiring board 753, the grounding member 755 is connected to a radiation via-hole 756 electrically connected in the wiring board 755.

Heat produced at electrical circuits and so on is transmitted to the metal connector case 750b through the heat radiating via-hole 756 and the grounding member 755. Then, heat is radiated to an exterior of the connector through a heat-radiating portion 757.

Simultaneously, the metal connector case 750b prevents electromagnetic wave produced in the connector from radiating to an exterior of the connector.

The MT-RJ type optical connector plug 720 has a connector attaching/detaching lever 722 for fixing. The metal connector case 750b has a notch 723 for embedding the lever and strong enough to insert the optical connector into the receptacle 754.

Except for the metal connector case 750b, a low-priced plastic connector case 750a is comprised.

Third Embodiment

Figure 8:
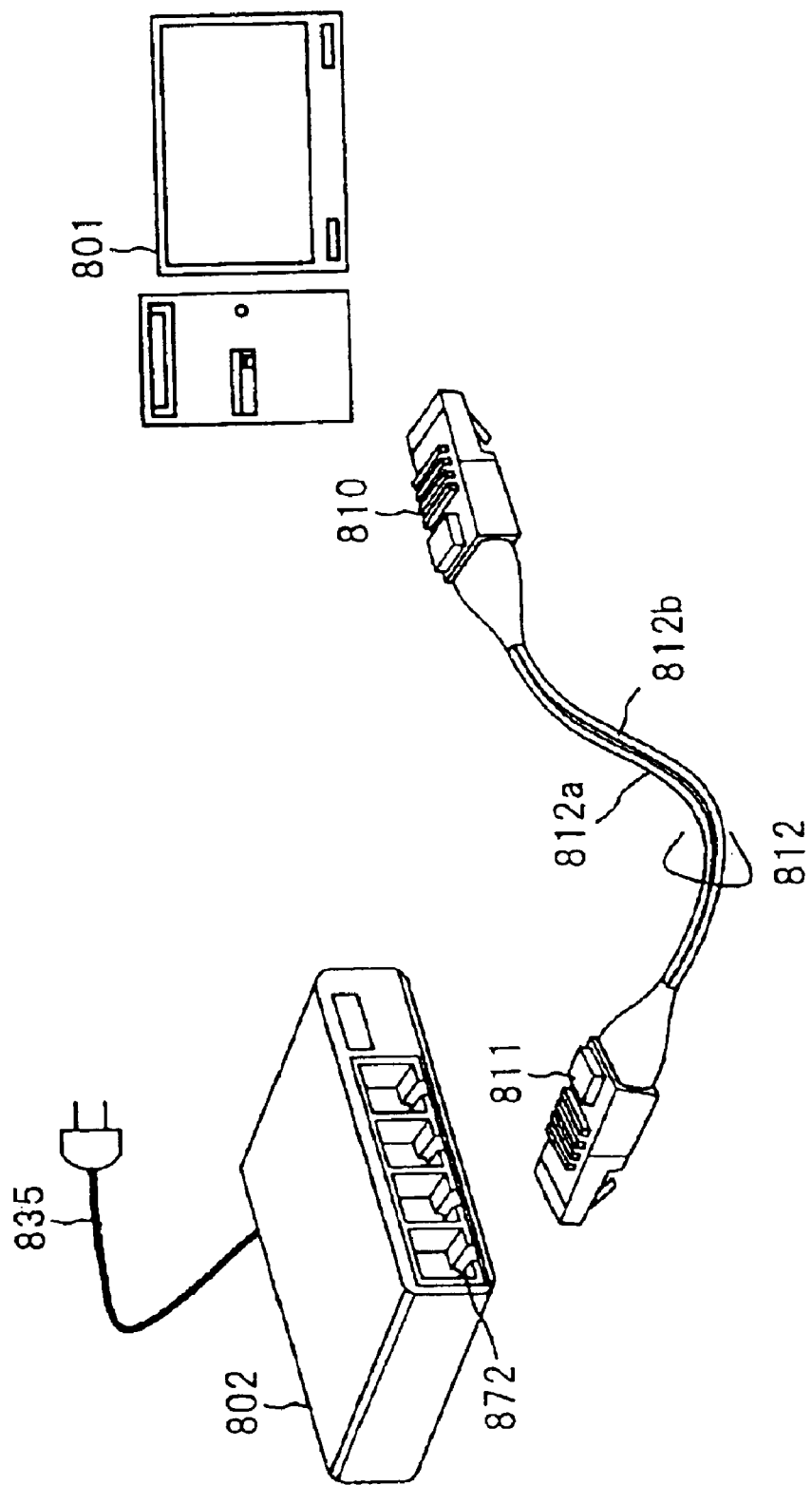
FIG. 8 shows a third embodiment of the present invention.

FIG. 8 shows the third embodiment according to the present invention, wherein a terminal and a hub are connected by a modular type optical active connector having eight wires/contacts.

A terminal 801 and a hub 802 are connected by a series of modular plug type optical active connector having eight wires/contacts 810 and 811. The modular plug type optical active connector having the eight wires/contacts 810 is inserted into an electric connector port (not shown) of the terminal 801 and the modular plug type optical active connector 811 having the eight wires/contacts is inserted into an electric connector port 872 of the hub 802.

The two-line optical fiber cable 812 comprises a cable 812a and a cable 812b.

With respect to the hub 802, it is necessary to provide an exterior battery source. Therefore, an electric battery cord 835 is provided.

Under the foregoing structure, an electric signal transmitted from the terminal 801 is converted to an optical signal at an optical active connector 810. Such an optical signal is transmitted to the optical active connector 811 through the cable 812a of the two-line optical fiber cables 812. The optical signal is converted to an electric signal again and the electric signal is received at the hub 802.

In the case that an electric signal is transmitted from the hub 802, the electric signal is converted to an optical signal at the optical active connector 811 and transmitted to the optical active connector 810 through the other cable 812b of the two-line optical fiber cables 812. The optical signal is converted to an electric signal again and the electric signal is received at the terminal 801.

Figure 9:
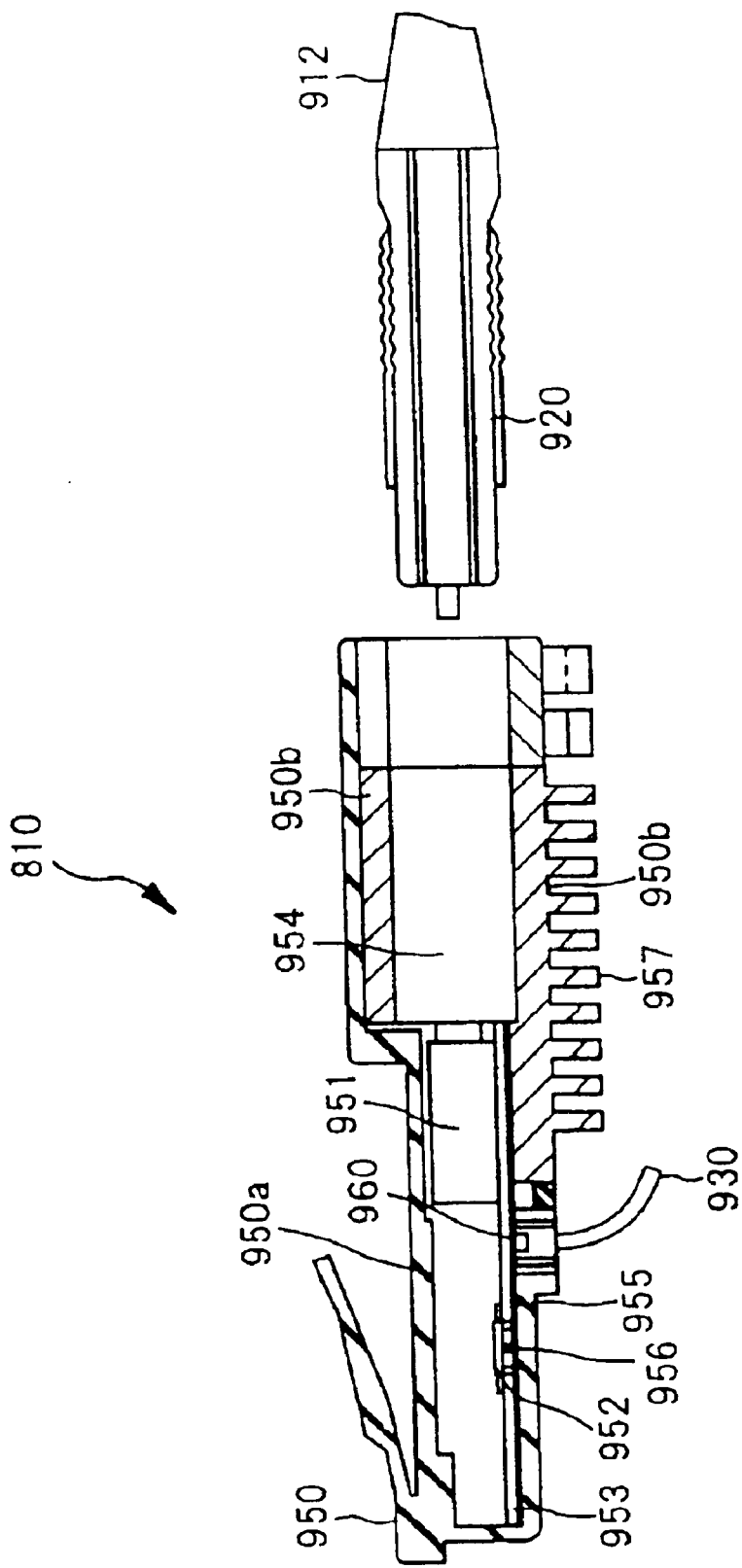
FIG. 9 is a cross-sectional view of a modular plug type optical active connector plug having eight wires/contacts according to the third embodiment of the present invention.

FIG. 9 shows a detailed structure of the optical active connector 810.

The optical active connector 811 has the same structure.

The optical active connector 810 comprises an optical element, an optical sub-module 951 capable of converting an electric signal and an optical signal, electrical circuits 952 electrically connected to the optical sub-module 951 and capable for transmitting, amplifying, and identifying a signal, a wiring board 953 on which resistances and condensers are arranged and a connector case 950 having a modular plug type electric interface having eight wires/contacts inside which these elements are installed.

A battery supply cord 930 is connected to a load-dispatch pad 960 to supply electric power to the electrical circuits 952.

A receptacle 954 is adapted to the optical sub-module 951 as an optical interface.

In the third embodiment, an optical interface is MU type and the MU type optical connector plug 920 is adapted to each end of the two-line optical fiber cable 912 to insert into a receptacle 954 of the optical sub-module.

The connector case 950 is formed by a metal piece and a plastic piece. A metal connector case 950b covers the optical sub-module 951 having the receptacle 954 and a part of the wiring board 953. By contacting with the wiring board 953 and a grounding member 955 provided at the lowermost layer of the wiring board 953, the grounding member 955 is connected to a radiation via-hole 956 electrically connected in the wiring board 955.

Heat produced at electrical circuits and so on is transmitted to the metal connector case 950b through the heat radiating via-hole 956 and the grounding member 955. Then, heat is radiated to an exterior of the connector through a heat-radiating portion 957.

Simultaneously, the metal connector case 950b prevents electromagnetic wave produced in the connector from radiating to an exterior of the connector and is strong enough to insert the optical connector into the receptacle 954.

Except for the metal connector case 950b, the connector case comprises a low-priced plastic case 950a.

Fourth Embodiment

Figure 10:
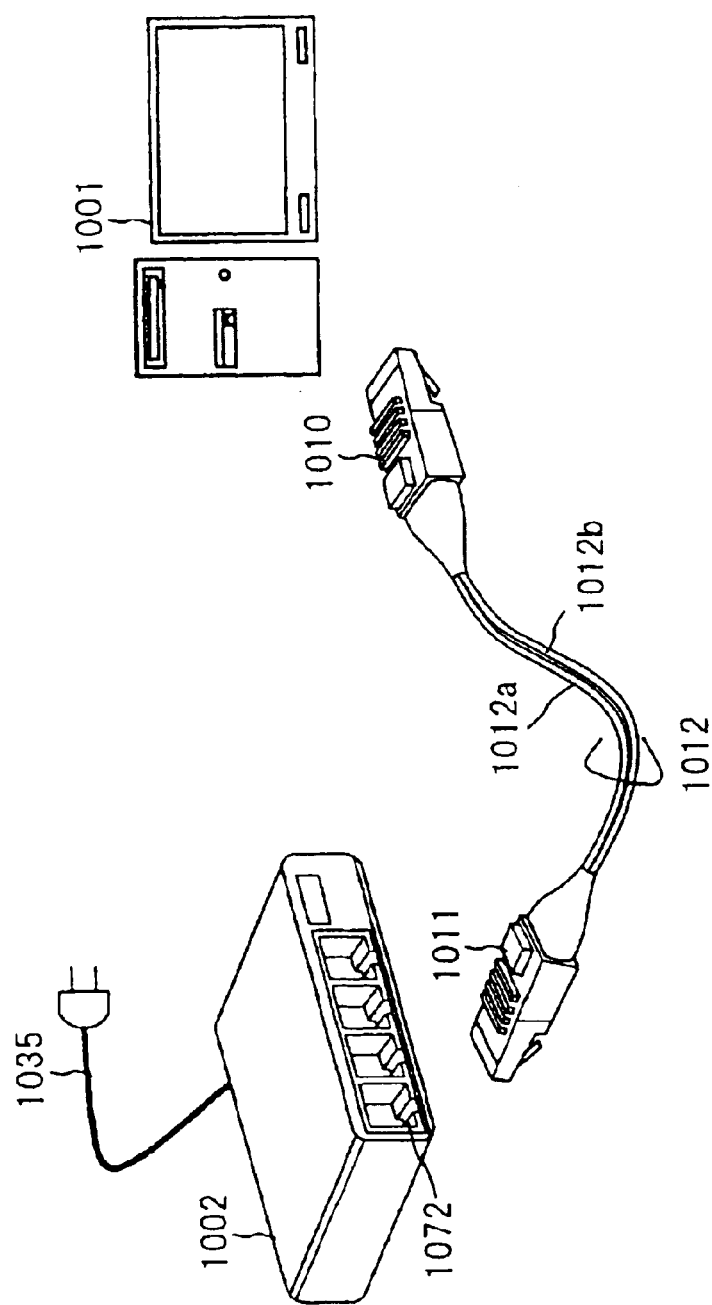
FIG. 10 is a fourth embodiment of the present invention.

FIG. 10 shows the fourth embodiment of the present invention, wherein a terminal and a hub are connected by a modular type optical active connector having eight wires/contacts.

A terminal 1001 and a hub 1002 are connected by a two-line optical fiber cable 1012 having modular plug type optical active connectors having eight wires/contacts 1010 and 1011. The modular plug type optical active connector having the eight wires/contacts 1010 is inserted into an electric connector port (not shown) of the terminal 1001 and the modular plug type optical active connector 1011 having the eight wires/contacts is inserted into an electric connector port 1072 of the hub 1002.

The two-line optical fiber cable 1012 comprises a cable 1012a and a cable 1012b.

With respect to the hub 1002, it is necessary to provide an exterior battery source. Therefore, a battery source cord 1035 is provided.

Under the foregoing structure, an electric signal transmitted from the terminal 1001 is converted to an optical signal at an optical active connector 1010. Such an optical signal is transmitted to the optical active connector 811 through the cable 1012a of the two-line optical fiber cable 1012. The optical signal is converted to an electric signal again and the electric signal is received at the hub 1002.

In the case that an electric signal is transmitted from the hub 1002, the electric signal is converted to an optical signal at the optical active connector 1011 and transmitted to the optical active connector 1010 through the other cable 1012b of the two-line optical fiber cables 1012. The optical signal is converted to an electric signal again and the electric signal is received at the terminal 1001.

Figure 11:
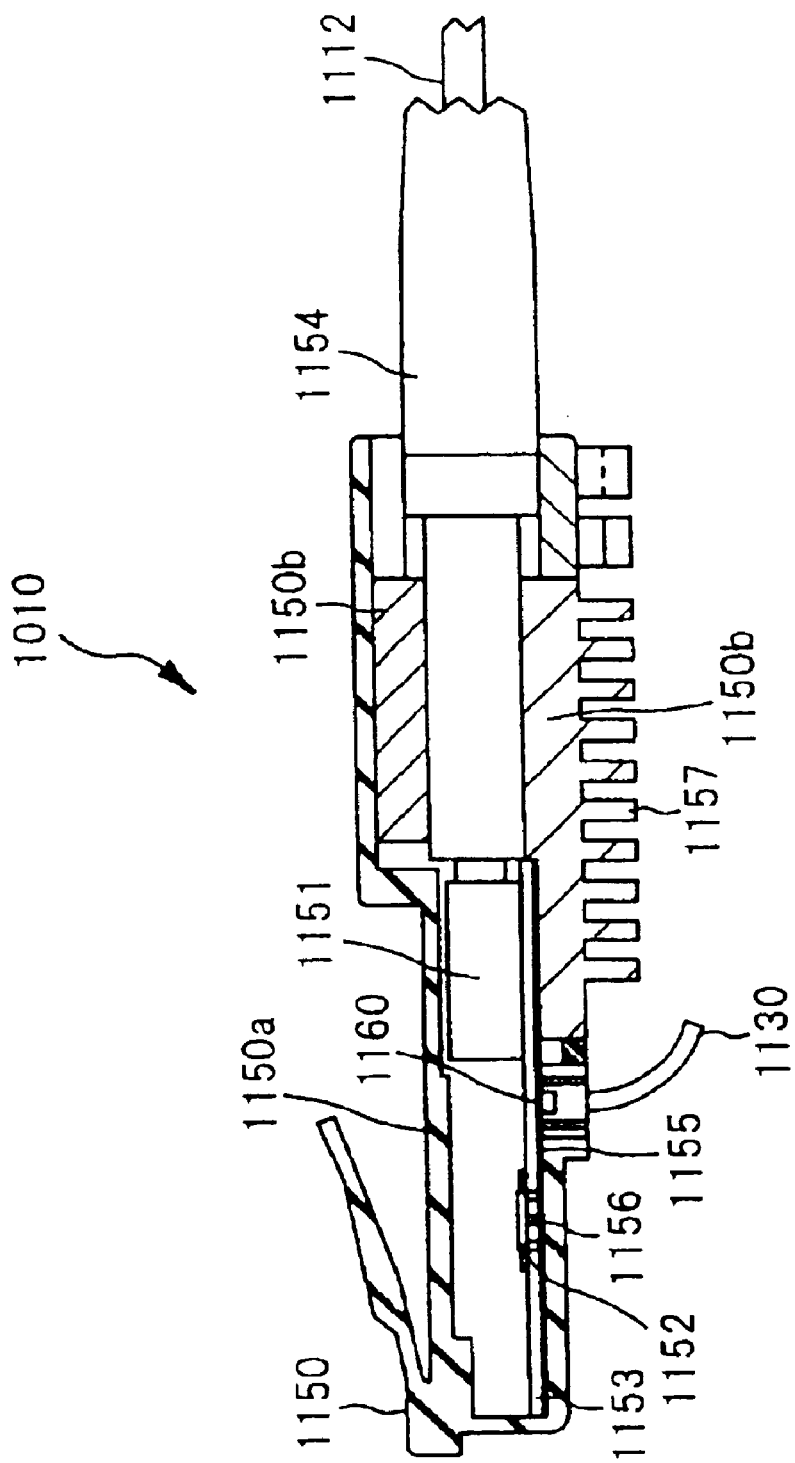
FIG. 11 shows a cross-sectional view of a modular plug type optical active connector plug having eight wires/contacts according to the fourth embodiment of the present invention.

FIG. 11 shows a detailed structure of the optical active connector 1010.

The optical active connector 1011 has the same structure.

The optical active connector 1010 comprises an optical element, an optical sub-module 1151 capable of converting an electric signal and an optical signal electrical circuits 1152 electrically connected to the optical sub-module 1151 and capable for transmitting, amplifying, and identifying a signal, a wiring board 1153 on which resistances and condensers are arranged, and a connector case 1150 having a modular plug type electric interface having eight wires/contacts inside which these elements are installed.

A battery supply cord 1130 is connected to a load-dispatch pad 1160 so as to supply electric power to the electrical circuits 1152.

A pigtail 1154 is integrally connected to an optical fiber cable 1112 as an optical interface and adapted to the optical sub-module 1150.

In the fourth embodiment, the connector case 1150 comprises a metal piece and a plastic piece. A metal connector case 1150b covers the optical sub-module 1151 having the pigtail 1154 and a part of the wiring board 1153. By contacting with the-wiring board 1153 and a grounding member 1155 provided at the lowermost layer of the wiring board 1153, the grounding member 1155 is connected to a radiation via-hole 1156 electrically connected in the wiring board 1155.

Heat produced at electrical circuits and so on is transmitted to the metal connector case 1150b through the heat radiating via-hole 1156 and the grounding member 1155. Then, heat is radiated to an exterior of the connector through a heat-radiating portion 1157.

Simultaneously, the metal connector case 1150b prevents electromagnetic wave produced in the connector from radiating to an exterior of the connector.

Except for the metal connector case 1150b, the connector case comprises a low-priced plastic case 1150a.

Fifth Embodiment

Figure 12:
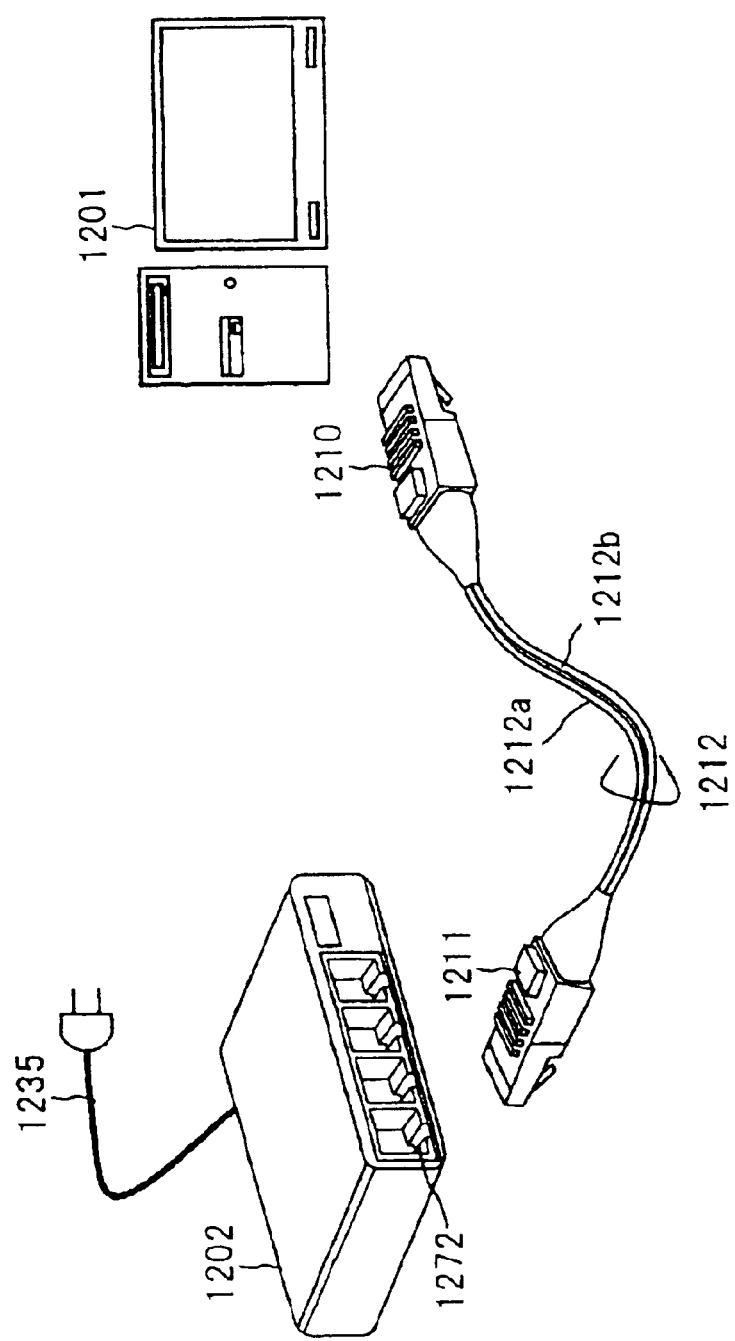
FIG. 12 is a fifth embodiment of the present invention.

FIG. 12 shows the fifth embodiment of the present invention, wherein a terminal and a hub are connected with a modular type optical active connector having eight wires/contacts.

A terminal 1201 and a hub 1202 are connected by a two-line optical fiber cable 1212 having modular plug type optical active connectors having eight wires/contacts 1210 and 1211. The modular plug type optical active connector having the eight wires/contacts 1210 is inserted into an electric connector port (not shown) of the terminal 1201 and the modular plug type optical active connector 1211 having the eight wires/contacts is inserted into an electric connector port 1272 of the hub 1202.

The two-line optical fiber cable 1212 comprises a cable 1212a and a cable 1212b.

With respect to the hub 1202, it is necessary to supply an exterior battery source. Therefore, an electric battery cord 1235 is provided.

Under the foregoing structure, an electric signal transmitted from the terminal 1201 is converted to an optical signal at an optical active connector 1210. Such an optical signal is transmitted to the optical active connector 1211 through the cable 1212a of the two-line optical fiber cable 1212. The optical signal is converted to an electric signal again and the electric signal is received at the hub 1202.

In the case that an electric signal is transmitted from the hub 1202, the electric signal is converted to an optical signal at the optical active connector 1211 and transmitted to the optical active connector 1210 through the other cable 1212b of the two-line optical fiber cable 1212. The optical signal is converted to an electric signal again and the electric signal is received at the terminal 1201.

Figure 13:
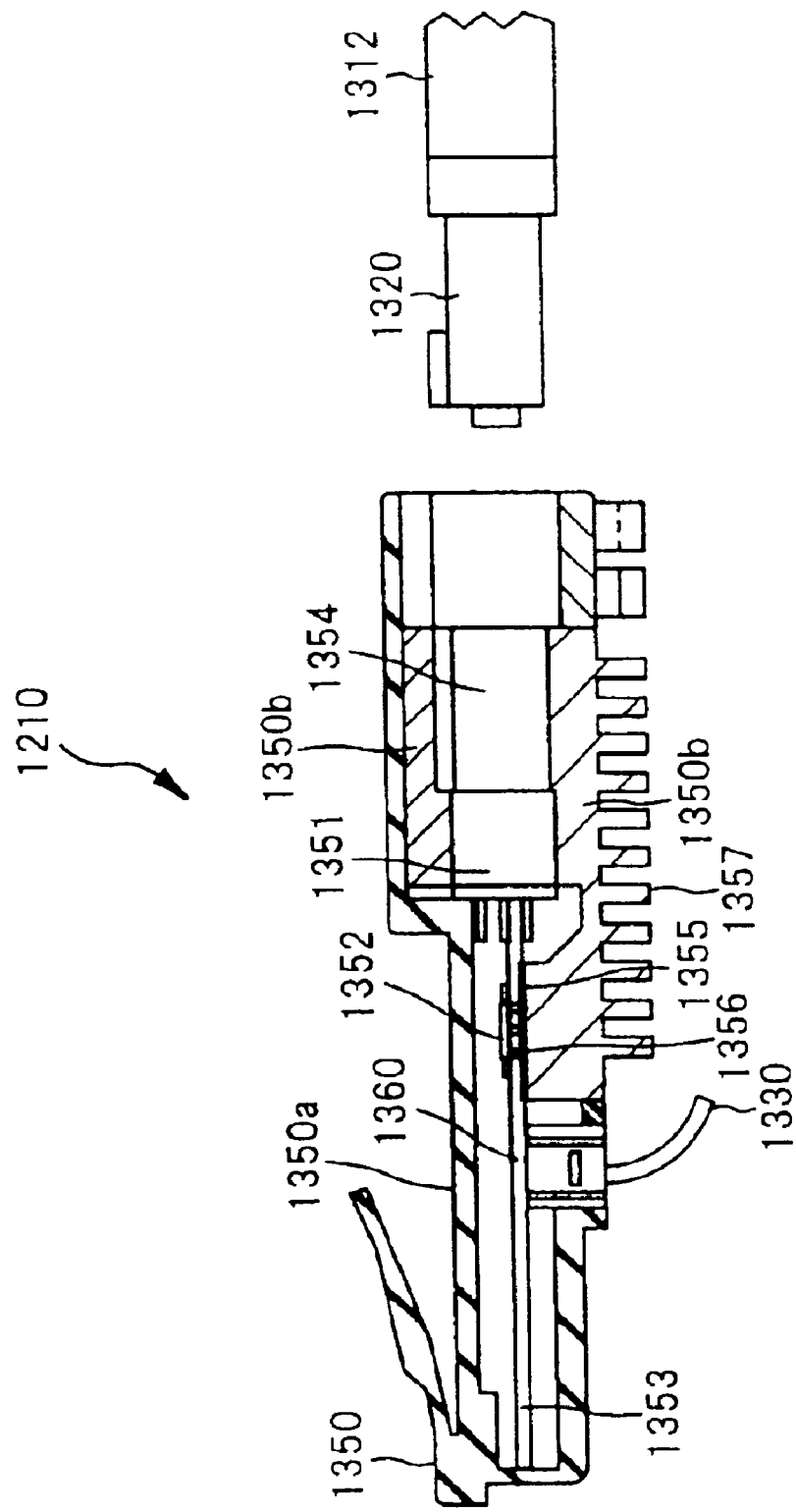
FIG. 13 is a cross-sectional view of a modular plug type active connector plug having eight wires/contacts according to the fifth embodiment of the present invention.

FIG. 13 shows a detailed structure of the optical active connector 1210.

The optical active connector 1211 has the same structure.

The optical active connector 1210 comprises an optical element, an optical sub-module 1351 capable of converting an electric signal and an optical signal, electrical circuits 1352 electrically connected to the optical sub-module 1351 and capable for transmitting, amplifying, and identifying a signal, a wiring board 1353 on which resistances and condensers are arranged, and a connector case 1350 having a modular plug type electric interface having eight wires/contacts inside which these elements are installed.

A battery supply cord 1330 is connected to a load-dispatch pad 1360 to supply electric power to the electrical circuits 1352.

A receptacle 1354 is adapted to the optical sub-module 1351.

In the fifth embodiment, the optical connector plug 1320 attached to each end of the two-line optical fiber cable 1312 inserted into the receptacle 1354 of the optical sub-module.

Further, in the fifth embodiment, in the case of employing a compact module (for example, CAN type) as the optical sub-module 1351, electrical circuit 1352 can be located near the optical sub-module 1351 since a size of the module becomes small.

Similar to the first through fourth embodiments, the connector case 1350 comprises a metal piece and a plastic piece. A metal connector case 1350*b* is electrically connected to electrical circuits 1352 through a heat radiation via-hole 1356 provided directly beyond a pad on which electrical circuit 1352 is mounted and a grounding conductor 1355 mounted on a wiring board 1353.

Heat produced at electrical circuits and so on is transmitted to the metal connector case 1350*b* through the shortest path and radiated to an exterior of the connector through a heat radiating portion 1357.

Simultaneously, the metal connector case 1350*b* prevents electromagnetic wave produced in the connector from radiating to an exterior of the connector and is enough strong to insert the optical connector into the receptacle 1354.

Except for the metal connector case 1350*b*, the connector case comprises a low-priced plastic case 1350*a*.

Sixth Embodiment

Figure 14:
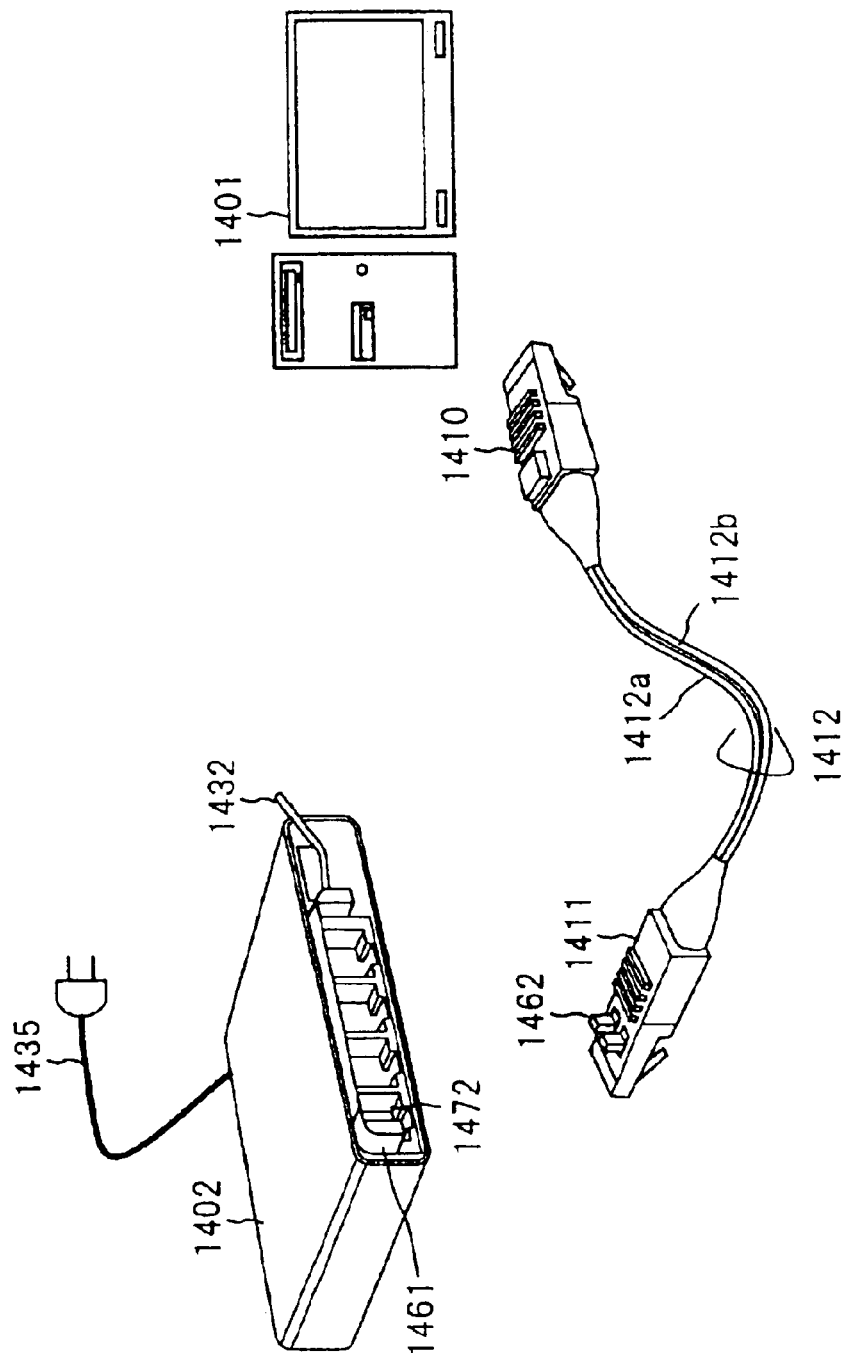
FIG. 14 is a perspective view of a sixth embodiment of the present invention.

FIG. 14 shows the sixth embodiment of the present invention, wherein a terminal and a hub are connected with a modular type optical active connector having eight wires/contacts.

A terminal 1401 and a hub 1402 are connected by a two-line optical fiber cable 1412 having modular plug type optical active connectors having eight wires/contacts 1410 and 1411.

The two-line optical fiber cable 1412 comprises a cable. 1412*a* and a cable 1412*b*.

With respect to the hub 1402, it is necessary to provide an exterior battery source. Therefore, a battery source cord 1435 is provided.

The modular plug type optical active connector having the eight wires/contacts 1410 is inserted into an electric connector port (not shown) of the terminal 1401.

A battery supply element 1461 connected to a battery source cord 1432 is fixed at a portion surrounding with electric connector port 1472 of the hub 1402. The modular plug type optical active connector 1411 having eight wires/contacts, which comprises two battery supply pins 1462 protruding from the connector case, is inserted into the electric connector port 1472 and thus electric power can be supplied.

The battery supply element 1461 may be split and fixed at portions surrounding with a plurality of electric connector port 1472.

Under the foregoing structure, an electric signal transmitted from the terminal 1401 is converted to an optical signal at an optical active connector 1410. Such an optical signal is transmitted to the optical active connector 1411 through the cable 1412*a* of the two-line optical fiber cable 1412. The optical signal is converted to an electric signal again and the electric signal is received at the hub 1402.

An electric signal is transmitted from the hub 1402, the electric signal is converted to an optical signal at the optical active connector 1411 and transmitted to the optical active connector 1410 through the other cable 1412*b* of the two-line optical fiber cables 1412. The optical signal is converted to an electric signal again and the electric signal is received at the terminal 1401.

Figure 15:
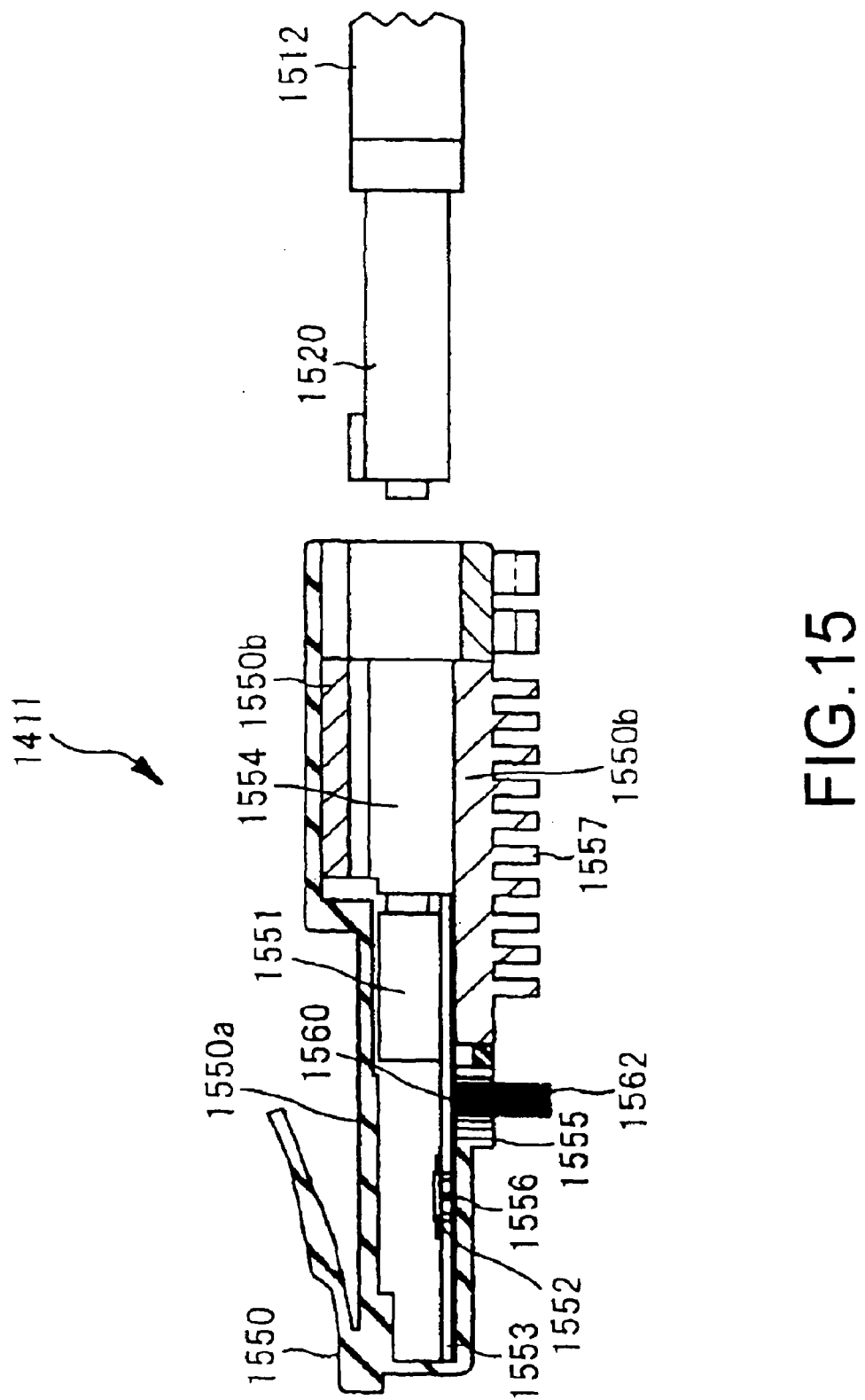
FIG. 15 is a cross-sectional view of a modular plug type optical active connector plug having eight wires/contacts according to the sixth embodiment of the present invention.

FIG. 15 shows a detailed structure of the optical active connector 1411.

The optical active connector 1411 comprises an optical element, an optical sub-module 1551 capable of converting an electric signal and an optical signal, electrical circuits 1552 electrically connected to the optical sub-module 1551 and capable for transmitting, amplifying, and identifying a signal, a wiring board 1553 on which resistances and condensers are arranged, and a connector case 1550 having a modular plug type electric interface having eight wires/contacts inside which these elements are installed.

The wiring board 1553 comprises two battery supply pins 1562, connected to a battery supply pad 156 and a front edge protruding from the connector case 1550.

The optical active connector 1411 is adapted to be received by the electric connector port 1472. The battery supply pins 1562 makes contact with the battery supply element 1461 so that electric power can be supplied to electrical circuits 1522.

A receptacle 1554 is adapted to the optical sub-module 1551 as an optical interface.

In the sixth embodiment, the optical connector plug 1520 attached to each end of the two-line optical fiber cable 1512 is inserted into the receptacle 1554 of the optical sub-module.

The connector case 1550 comprises a metal piece and a plastic piece. A metal connector case 1550*b* covers the optical sub-module 1551 having a receptacle 1554 and a part of the wiring board 1553. By contacting with the wiring board 1553 and a grounding member 1555 provided at the lowermost layer of the wiring board 1553, the grounding member 1555 is connected to a radiation via-hole 1556 electrically connected in the wiring board 1555.

Heat produced at electrical circuits and so on is transmitted to the metal connector case 1550*b* through the heat radiating via-hole 1556 and the grounding member 1555. Then, heat is radiated to an exterior of the connector through a heat-radiating portion 1557.

Simultaneously, the metal connector case 1550*b* prevents electromagnetic wave produced in the connector from radiating to an exterior of the connector and is strong enough to insert the optical connector into the receptacle 1554.

Except for the metal connector case 1550*b*, the connector case comprises a low-priced plastic case 1550*a*.

Figure 16:
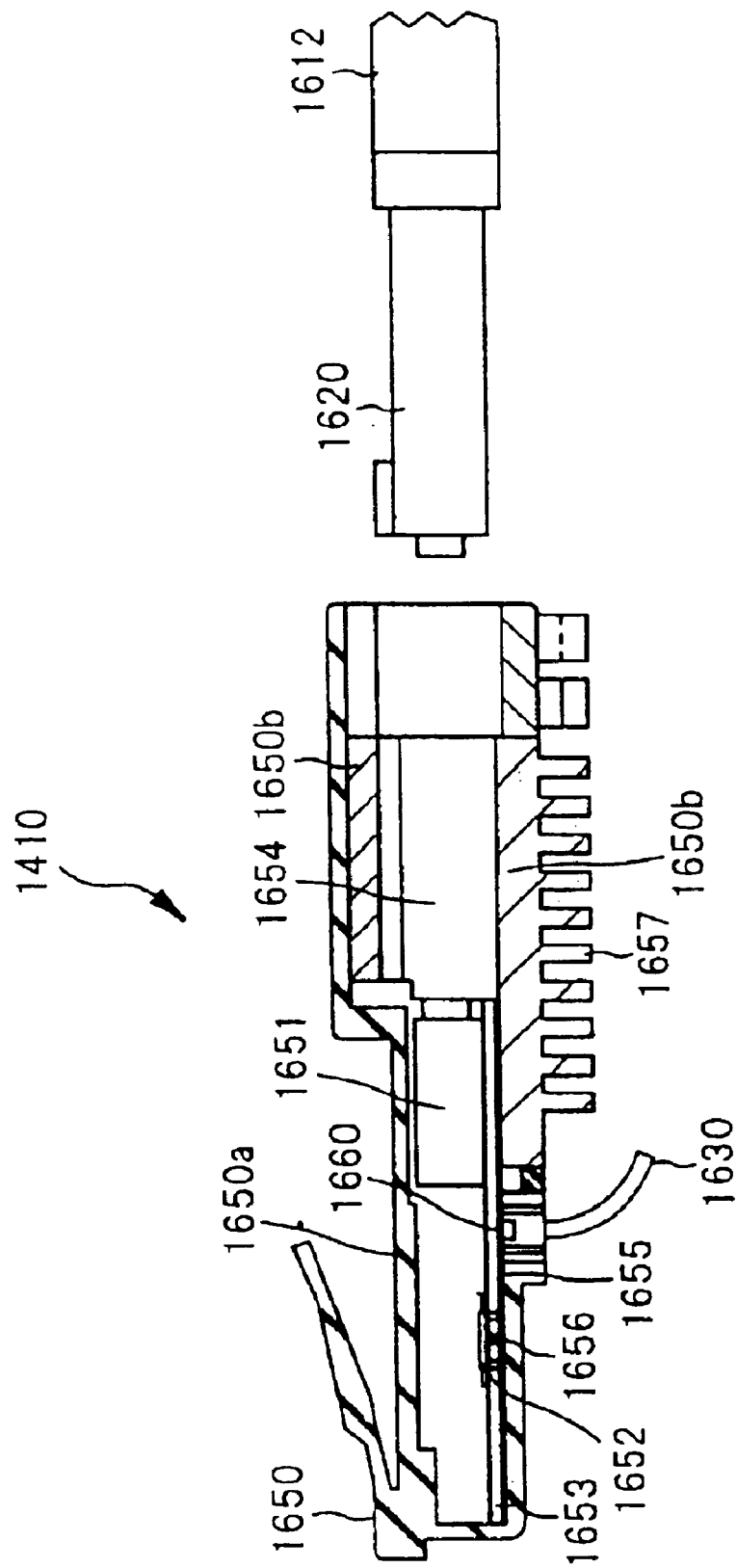
FIG. 16 is a cross-sectional view of a modular plug type active connector plug having eight wires/contacts according to the sixth embodiment according to the present invention.

Next, the optical active connector 1410 will be described with respect to FIG. 16.

A difference between the optical active connectors 1410 and 1411 is the battery supply element.

Instead of the battery supply pins 1562, a battery source cord 1630 is connected from a battery supply pad 1660 of the wiring board 1653 to electrical circuits 1652.

Regarding the other elements except for the battery supply element, the same elements are provided.

Figure 17:
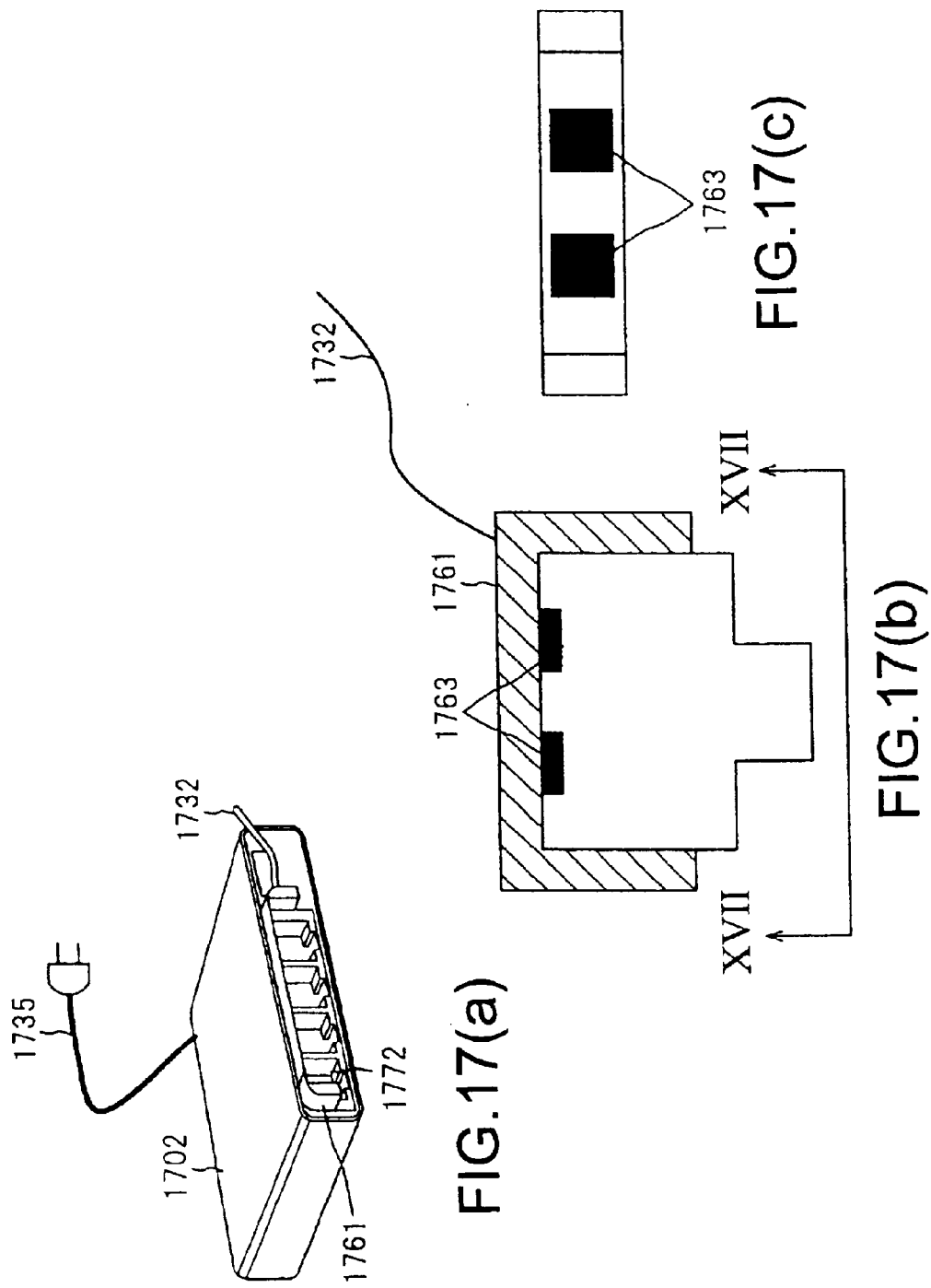
FIG. 17(a) is a perspective view of an optical active connector plug adapted to a hub according to the sixth embodiment of the present Invention.
FIG. 17(b) is a plan view of a supply Battery.
FIG. 17(c) is a cross-sectional view taken along a line III—III in FIG. 17(b)

With reference to FIG. 17, a battery supply structure for adapting an optical active connector to the optical active connector 1411 is described.

A battery supply element connected to a battery source cord 1432 as in FIG. 14, is made of an insulating material or coated with an insulating layer is fixed at a portion surrounding with an electric connector port 1772.

The battery supply element 1761 has two battery supply pads 1763 connected to a battery source cord 1732.

When the battery supply pad 1763 is adapted to the electric connector port 1772, a location of the battery supply pad 1763 is located so as to make contact with two battery supply pins provided at the optical active connector.

In order to supply electric power from an exterior battery source, a battery source cord 1735 is connected to the hub 1702.

Under the above structure, electric power can be supplied to the optical active connector by adapting the optical active connector to the electric connector port 1772. Thus, a desired performance can be accomplished.

If spring force is applied to the battery supply pad 1763, fixing strength of the electric supply element 1761 is further improved.

Seventh Embodiment

Figure 18:
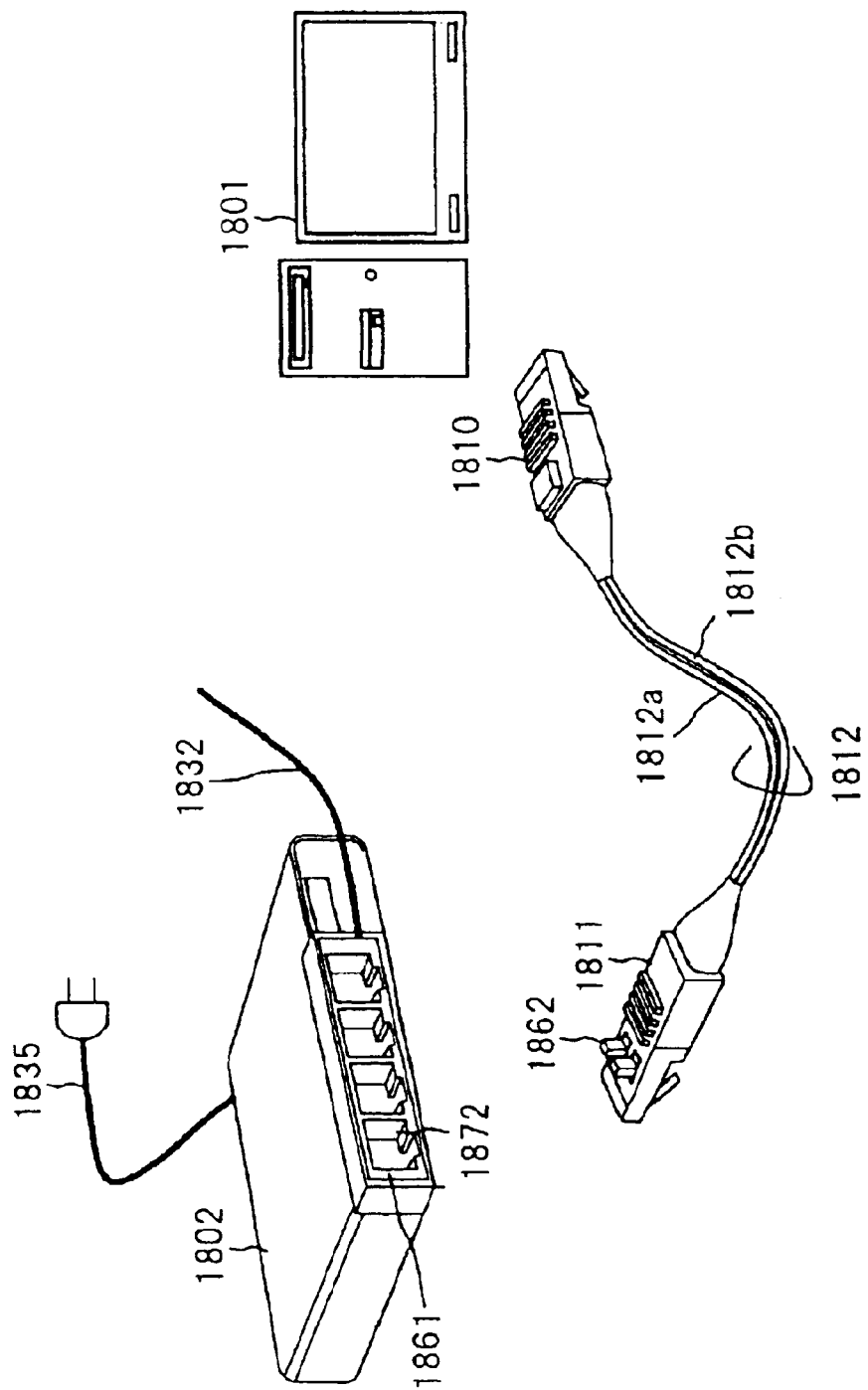
FIG. 18 is a perspective view of a seventh embodiment of the present invention.

FIG. 18 shows the seventh embodiment of the present invention, wherein a terminal and a hub are connected with a modular type optical active connector having eight wires/contacts.

A terminal 1801 and a hub 1802 are connected with a two-line optical fiber cable 1812 having modular plug type optical active connectors having eight wires/contacts 1810 and 1811. The modular plug type optical active connector 1810 having eight wires/contacts is inserted into an electric connector port (not shown) of the terminal 1801.

The two-line optical fiber cable 1812 comprises a cable 1812a and a cable 1812b.

With respect to the hub 1802, it is necessary to provide an exterior battery source. Therefore, an electric battery cord 1835 is provided.

The modular plug type optical active connector having the eight wires/contacts 1811 is inserted into an electric connector port 1872 of the terminal hub 1802 through a battery supply board 1861.

When the optical active connector 1811 is adapted, the battery supply board 1861 is mechanically held between the optical active connector 1811 and the optical electric connector port 1872.

A battery supply element 1861 is connected to a battery source cord 1832 to supply power to two battery supply pins 1862.

Under the above structure, an electric signal transmitted from the terminal 1801 is converted to an optical signal at an optical active connector 1810. Such an optical signal is transmitted to the optical active connector 1811 through the cable 1812a of the two-line optical fiber cable 1812. The optical signal is converted to an electric signal again and the electric signal is received at the hub 1802.

When an electric signal is transmitted from the hub 1802, the electric signal is converted to an optical signal at the optical active connector 1811 and transmitted to the optical active connector 1810 through the other cable 1812b of the two-line optical fiber cables 1812. The optical signal is converted to an electric signal again and the electric signal is received at the terminal 1801.

Figure 19:
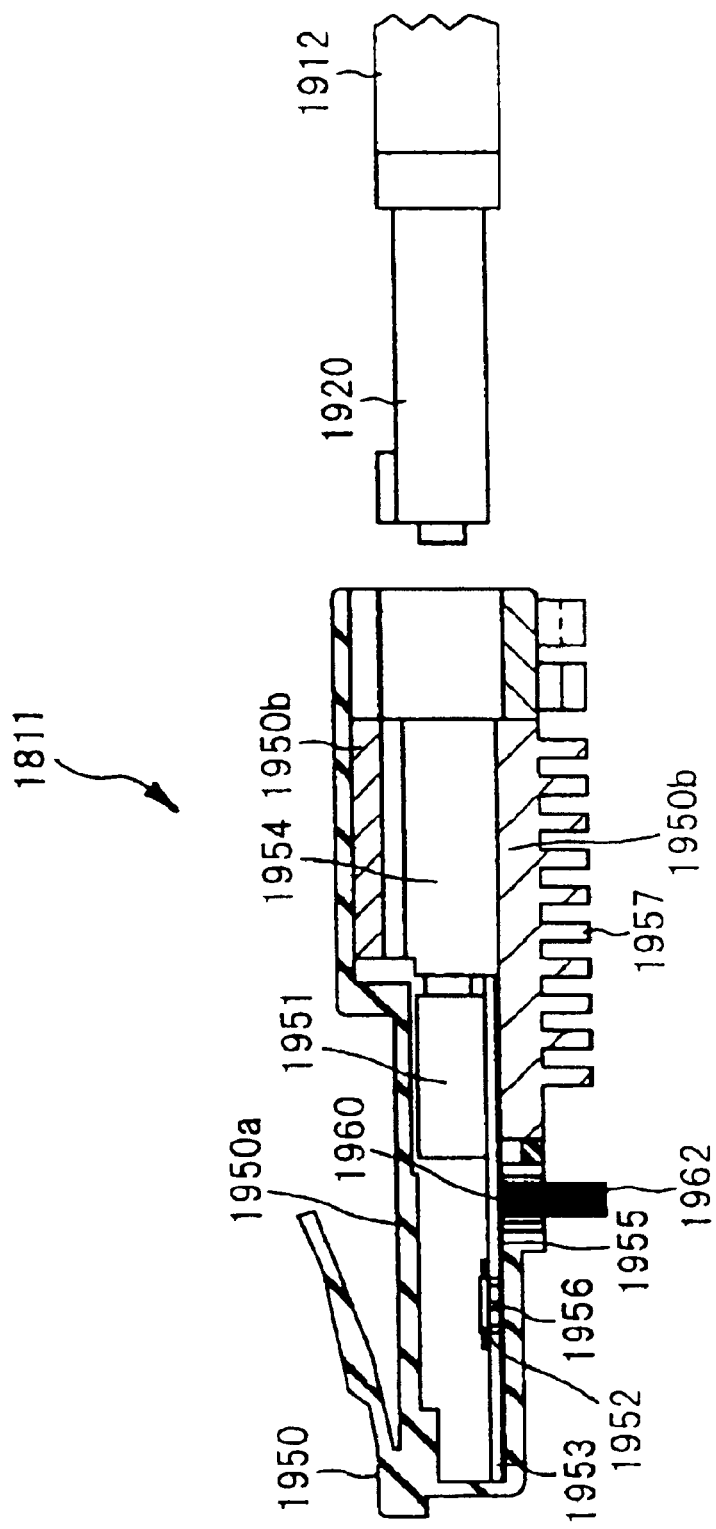
FIG. 19 is a cross-sectional view of a modular plug type optical active connector plug according to the seventh embodiment of the present invention.

FIG. 19 shows a detailed structure of the optical active connector 1811.

The optical active connector 1811 comprises an optical element, an optical sub-module 1951 capable of converting an electric signal and an optical signal, electrical circuits 1952 electrically connected to the optical sub-module 1951 and capable of transmitting, amplifying, and identifying a signal, a wiring board 1953 on which resistances and condensers are arranged, and a connector case 1950 having a modular plug type electric interface having eight wires/contacts inside which these elements are installed.

The wiring board 1953 comprises two battery supply pins 1962, connected to a battery supply pad 1960 and a front edge protruding from the connector case 1950.

When the optical active connector 1811 is adapted, the battery supply pins 1962 make contact with a battery supply element 861 fixed at the electric connector port 1872 of the hub 1802 so that electric power can be supplied to electrical circuits 1952.

A receptacle 1954 is adapted to the optical sub-module 1951 as an optical interface.

In the seventh embodiment, the optical connector plug 1920 provided at each end of the two-line optical fiber cable 1912 is adapted to be attached to/detached from the receptacle 1954.

The connector case 1950 comprises a metal piece and a plastic piece. A metal connector case 1950b covers the optical sum-module 1951 having the receptacle 1954 and a part of the wiring board 1953. By making contact with the wiring board 1953 and a grounding member 1955 provided at the lowermost layer of the wiring board 1953, the grounding member 1955 is connected to a radiation via-hole 1956 electrically connected in the wiring board 1955.

Heat produced at electrical circuits and so on is transmitted to the metal connector case 1550b through the heat radiating via-hole 1956 and the grounding member 1955. Then, heat is radiated to an exterior of the connector through a heat-radiating portion 1957.

Simultaneously, the metal connector case 1950b prevents electromagnetic wave produced in the connector from radiating to an exterior of the connector and is enough strong to insert the optical connector into the receptacle 1954.

Except for the metal connector case 1950b, the connector case comprises a low-priced plastic case 1950a.

Figure 20:
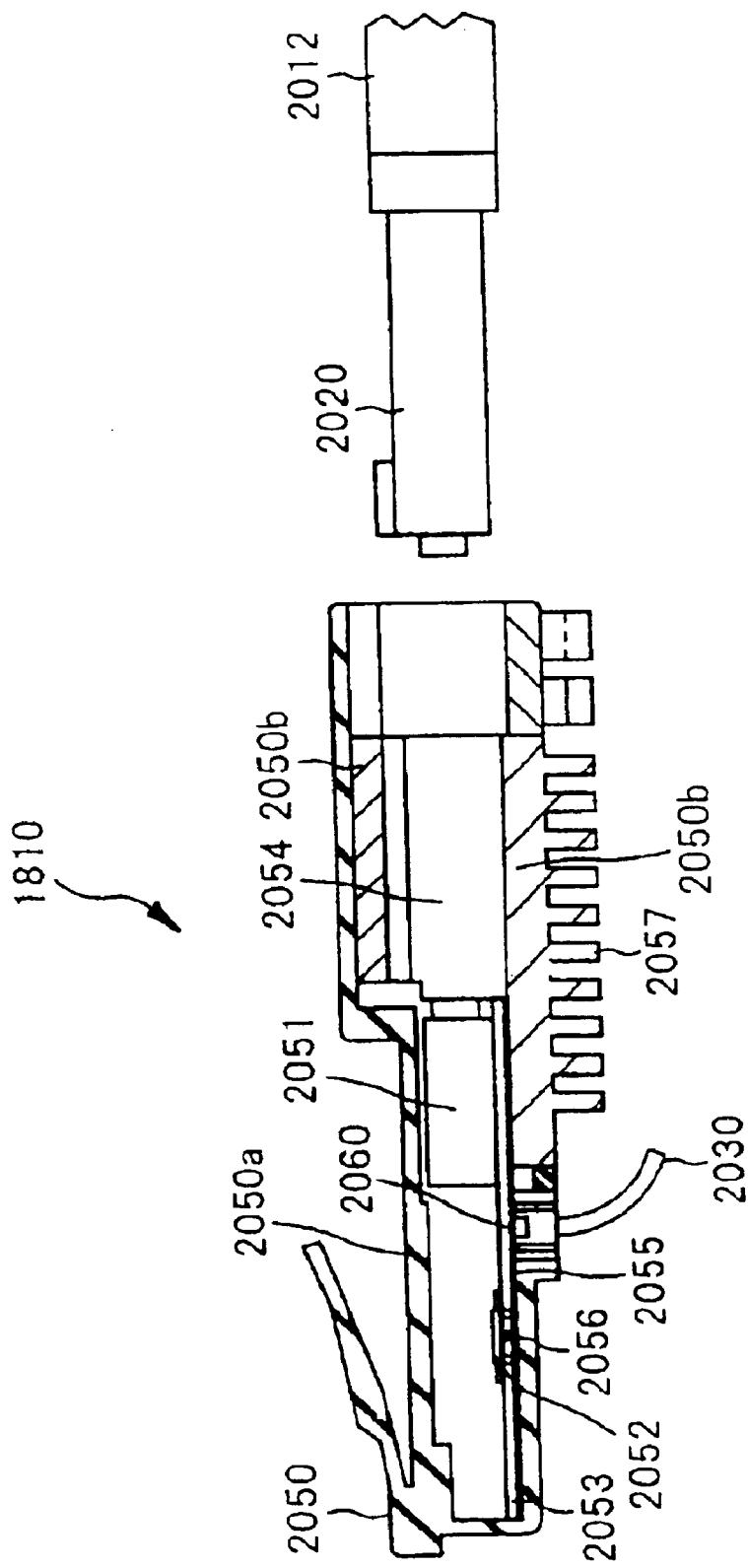
FIG. 20 is a cross sectional view of another modular plug type optical active connector plug according to the seventh embodiment of the present invention.

Next, the optical active connector 1810 will be described with respect to FIG. 20.

A difference between the optical active connectors 1910 and 1911 is a battery supply element.

Instead of the battery supply pin 1962, a battery source cord 2030 is connected from a battery supply pad 2060 of the wiring board 2053 to electrical circuits 2052.

Regarding the other elements except for the battery supply element, the same elements are provided.

Figure 21A:
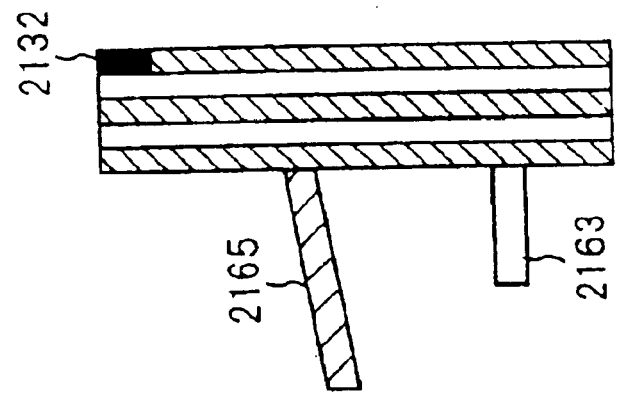
FIG. 21(a) is a plan view of a battery board of the seventh embodiment of the present invention.
Figure 21B:
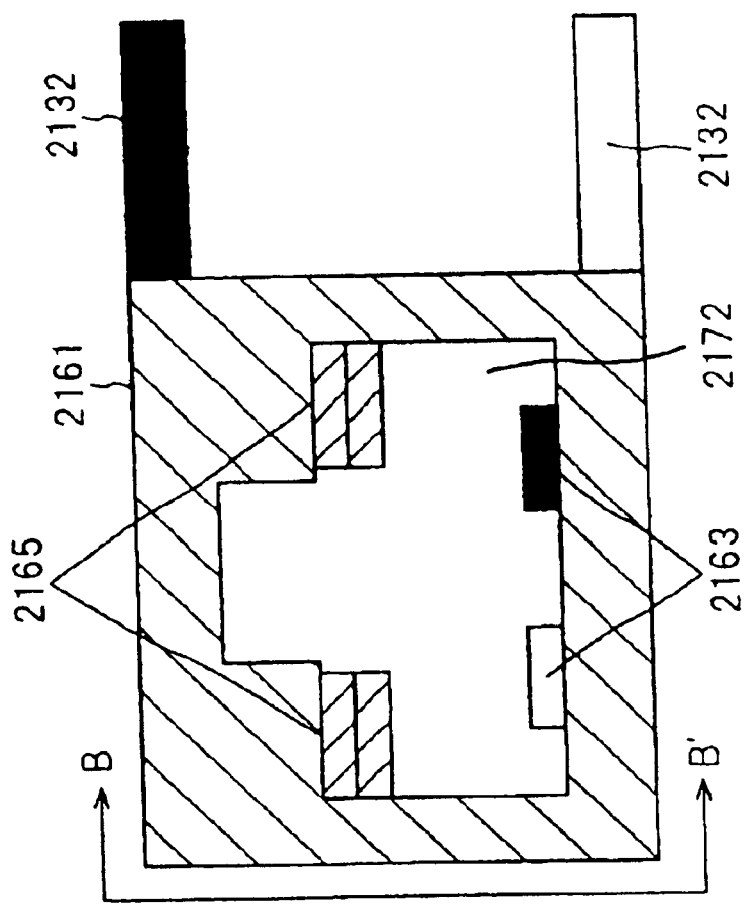
FIG. 21(b) is across-sectional view taken a long a line XXI—XXI in FIG. 21(a)

With reference to FIG. 21, a battery supply board 2161 is described.

On a battery supply element 2161, which is made of an insulating material or coated with an insulating layer, a hole having a shape suitable for a modular plug having eight wires/contacts is formed. A reinforce spring is provided so as to securely fix the modular plug having eight wires/contacts.

The battery supply element 2161 has two battery supply pads 2163 connected to a battery source cord 2132. (corresponds to the battery source cord 1832 shown in FIG. 18).

When the battery supply pad 2163 is adapted to the electric connector port 2172, a location of the battery supply pad 2163 is located so as to make contact with two battery supply pins 1862 provided at the optical active connector 1811.

When the optical active connector 1811 is adapted, a battery supply board 2161 is positioned at a portion between the optical active connector 1811 and the electric connector port 2172 and locked by the reinforcement spring 2165 to hold the battery supply board 2161 mechanically.

If spring force is applied to the battery supply pads 2163, fixing strength for the battery supply board 2161 is further increased.

Eighth Embodiment

Figure 22:
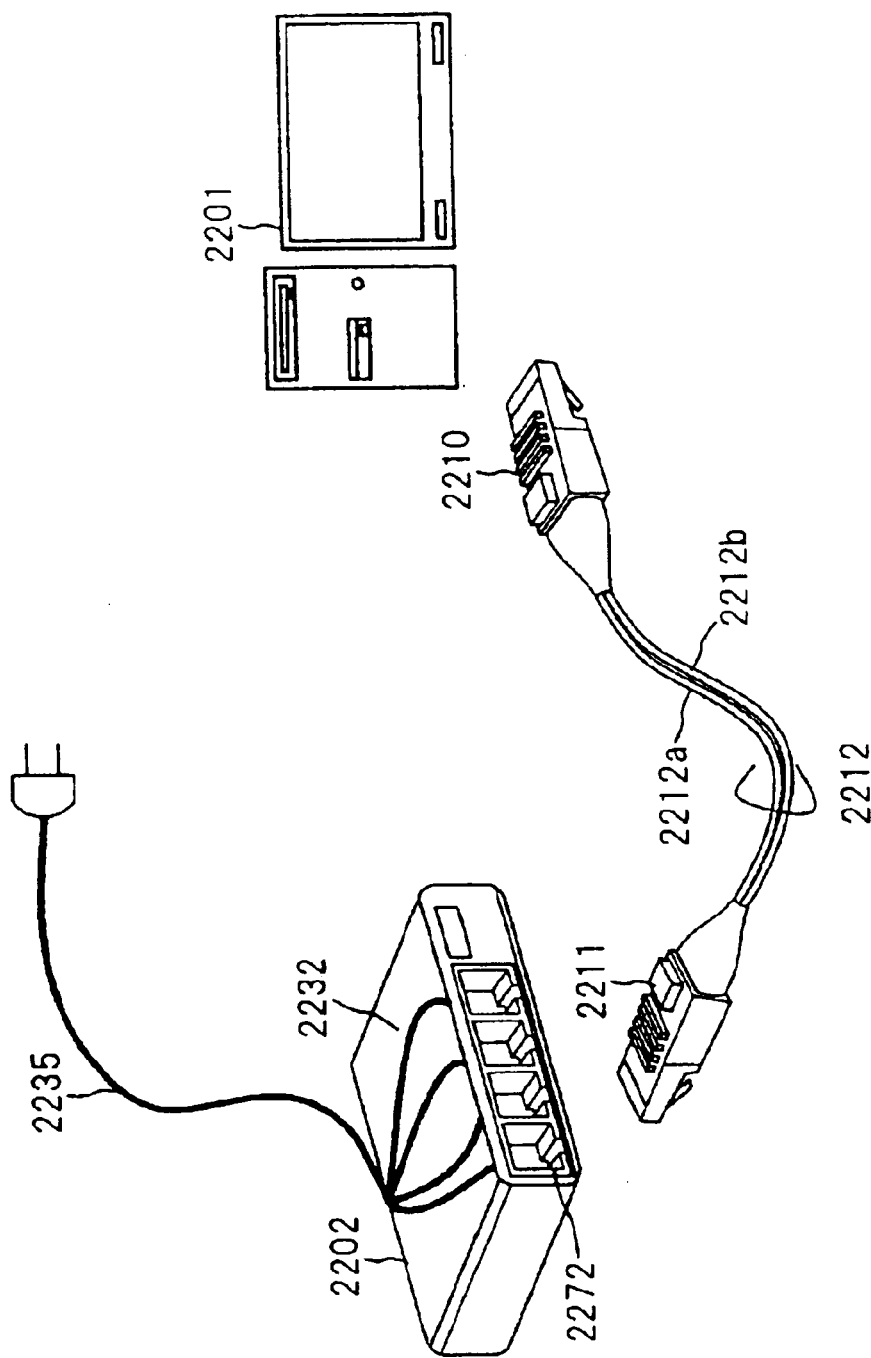
FIG. 22 is a perspective view of an eighth embodiment of the present invention.

FIG. 22 shows the eighth embodiment of the present invention, wherein a terminal and a hub are connected by a modular type optical active connector having eight wires/contacts.

A terminal 2201 and a hub 2202 are connected by a two-line optical fiber cable 2212 having modular plug type optical active connectors having eight wires/contacts 2210 and 2211.

The two-line optical fiber cable 2212 comprises a cable 2212*a* and a cable 2212*b*.

With respect to the hub 2202, it is necessary to provide an exterior battery source. Therefore, an electric battery cord 2235 is provided.

The modular plug type optical active connector having the eight wires/contacts 2210 is inserted into an electric connector port (not shown) of the terminal 2201. The modular plug type optical active connector having the eight contact 2211 is inserted into an electric connector port 2272 of the hub 2202.

Under the above structure, an electric signal transmitted from the terminal 2201 is converted to an optical signal at an optical active connector 2210. Such an optical signal is transmitted to the optical active connector 2211 through the cable 2212*a* of the two-line optical fiber cable 2212. The optical signal is converted to an electric signal again and the electric signal is received at the hub 2202.

When an electric signal is transmitted from the hub 2202, the electric signal is converted to an optical signal at the optical active connector 2211 and transmitted to the optical active connector 2210 through the other cable 2212*b* of the two-line optical fiber cables 2212. The optical signal is converted to an electric signal again and the electric signal is received at the terminal 2201.

Figure 23:
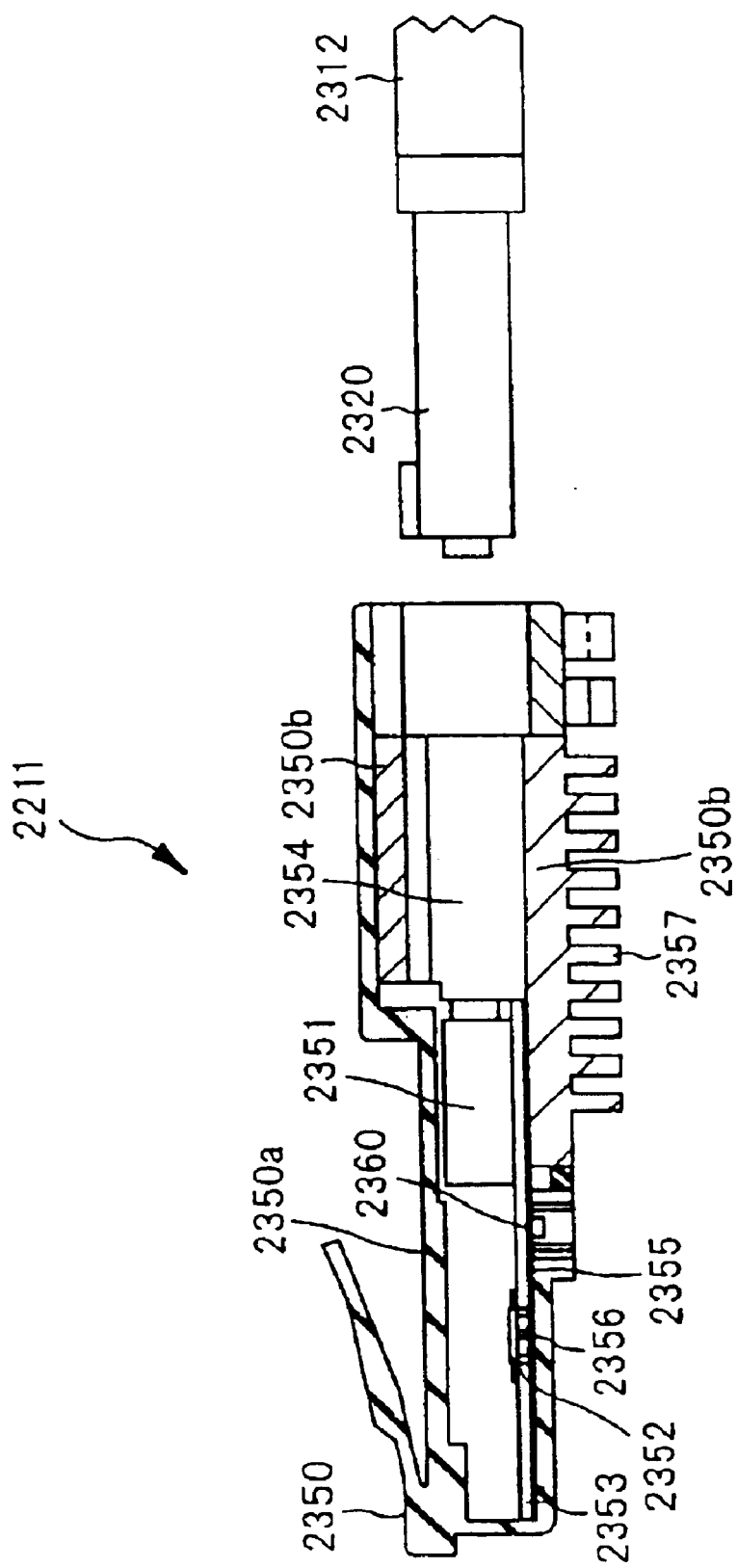
FIG. 23 is a cross-sectional view of a modular plug type optical active connector plug having eight connectors according to the eighth embodiment of the present invention.

FIG. 23 shows a detailed structure of the optical active connector 2211.

The optical active connector 2211 comprises an optical element, an optical sub-module 2351 capable of converting an electric signal and an optical signal, electrical circuits 2352 electrically connected to the optical sub-module 2351 and capable of transmitting, amplifying, and identifying a signal, a wiring board 2353 on which resistances and condensers are arranged and a connector case 2350 having a modular plug type electric interface having eight wires/contacts inside which these elements are installed.

In the case of transmitting/receiving Ethernet signal, four of eight electrode terminals are utilized and the remaining four electrode terminals are dead.

Accordingly, these dead electrode terminals are used as battery supply terminals. Electric power supplied from an battery source cord 2235 of the hub 2202 is also distributed to the electric connector port 2272 provided at a front face of the hub through battery source cords 2232 (refer to FIG. 22) so that a special battery source cord is unnecessary. Therefore, energy power is supplied to the dead electrode terminals that are not used for transmitting/receiving an electric signal The dead electrode terminals having eight wires/contacts act as a battery supply path to electrical circuits 2352 through a wiring board 2353.

A receptacle 2354 is adapted to the optical sub-module 2351 as an optical interface.

In the eighth embodiment, the optical connector plug 2320 attached to each end of the two-line optical fiber cable 2312 is inserted into the receptacle 2354 of the optical sub-module.

The connector case 2350 comprises a metal piece and a plastic piece. A metal connector case 2350*b* covers the optical sub-module 2351 having the receptacle 2354 and a part of the wiring board 2353. By making contact with the wiring board 2353 and a grounding member 2355 provided at the lowermost layer of the wiring board 2353, the grounding member 2355 is connected to a radiation via-hole 2356 electrically connected to the wiring board 2355.

Heat produced at electrical circuits and so on is transmitted to the metal connector case 2350*b* through the heat radiating via-hole 2356 and the grounding member 2355. Then, heat is radiated to an exterior of the connector through a heat radiating portion 2357.

Simultaneously, the metal connector case 2350*b* prevents electromagnetic wave produced in the connector from radiating to an exterior of the connector and is strong enough to insert the optical connector into the receptacle 2354.

Except for the metal connector case 2350*b*, the connector case comprises a low-priced plastic case 2350*a*.

Figure 24:
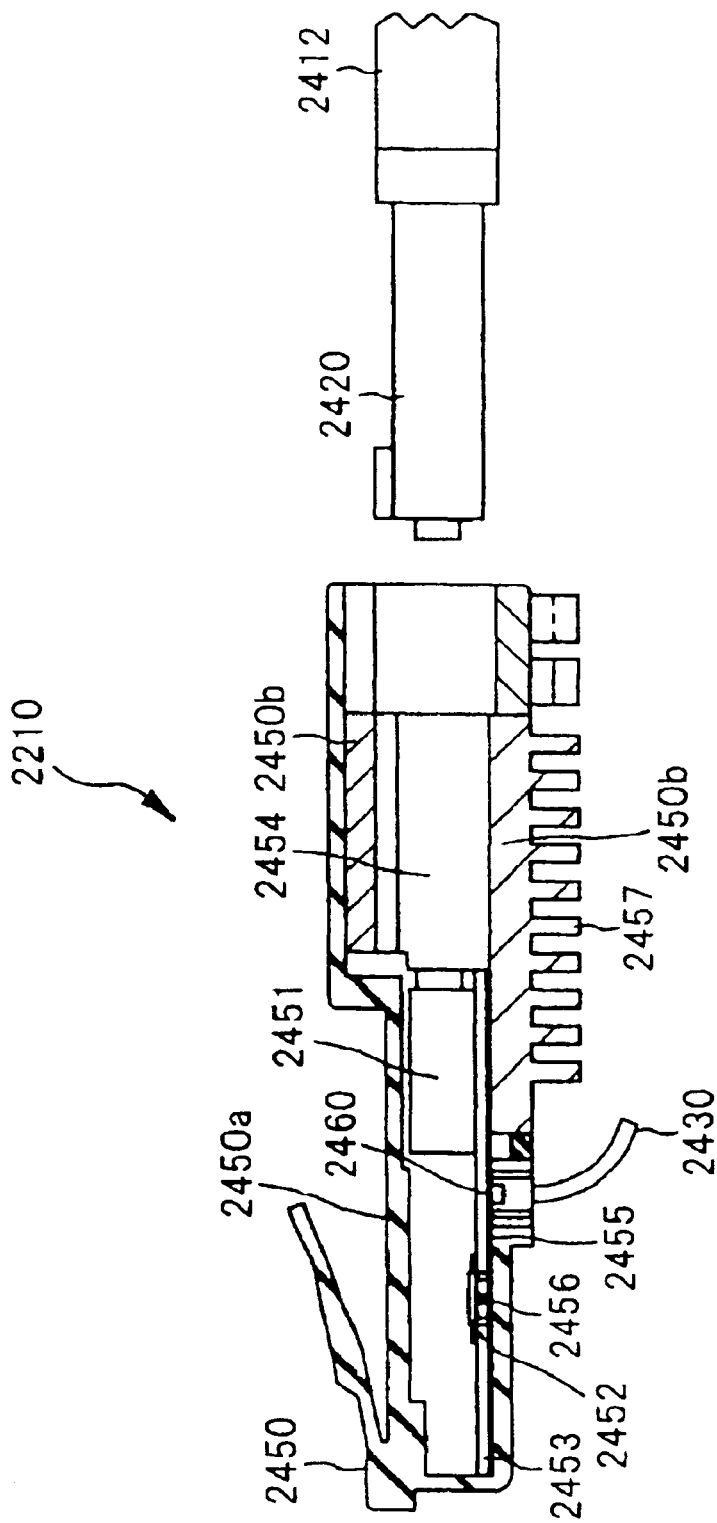
FIG. 24 is a cross-sectional view of another modular plug type optical active connector plug according to the eighth embodiment of the eighth embodiment.

Next, the optical active connector 2210 will be described with reference to FIG. 24.

A difference between the optical active connectors 2210 and 2211 is a battery supply element.

An electric cord 2430 is connected from a battery supply pad 2460 of the wiring board 2453 to electrical circuits 2452.

Regarding the other elements except for the battery supply element, the same elements are provided.

Figure 25B:
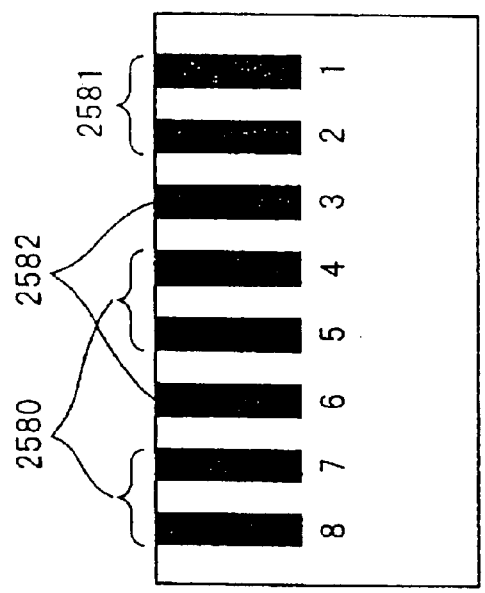
FIG. 25(b) shows an arrangement of electrode terminals.
Figure 25A:
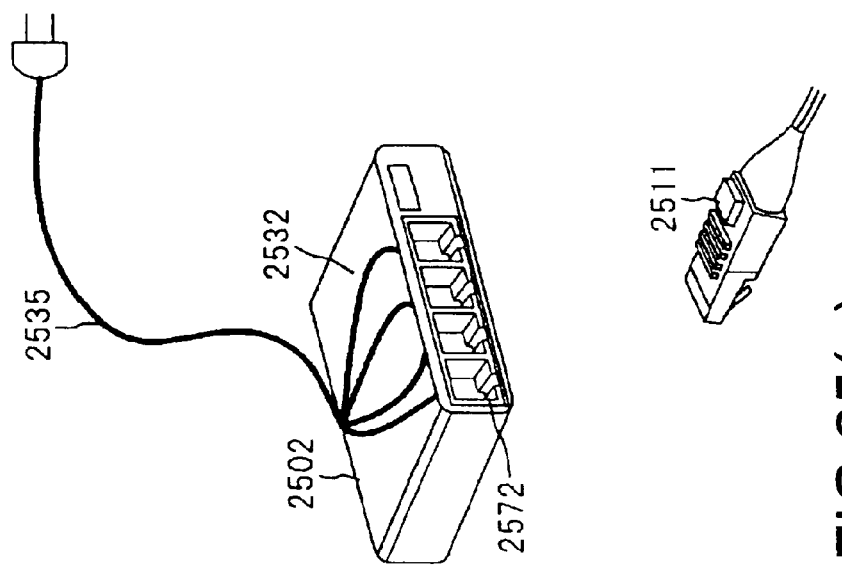
FIG. 25(a) is a perspective view of the modular plug type optical active connector plug having eight wires/contacts according to the eighth embodiment of the present invention.

With reference to FIG. 25, dead terminals of the modular plug having eight wires/contacts are described.

As shown in FIG. 25(*b*), eight electrode terminals of the optical active connector 2511 for transmitting/receiving an electric signal are aligned horizontally. The first and second terminals are transmitting electrode terminals 2581 and the third and sixth terminals are used as receiving electrode terminals 2582. The other terminals, that is, the fourth, fifth, seventh and eighth terminals are dead electrode terminals 2580.

Next, a system for supplying electric power from the hub 2502 to the optical active connector through the dead electrode terminals is described.

Electric power supplied from an electric cord 2535 of the hub 2502 is distributed to the electric connector port 2572 provided at affront face of the hub through the battery source cord 2535 of the hub 2502.

The hub 2502 comprises the battery source cord 2535 for supplying power from the exterior.

By adapting the optical active connector 2511 into the electric connector port 2572, electric power can be supplied to the optical active connector through the dead electrode thermal 2580.

In the embodiments described above, an electric connector is a modular plug type having eight wires/contacts However, the same effect can be obtained from the other type connectors according to the present invention.

An optical connector described in the first embodiment may be a MU type, a MT-RJ type and the others.

Regarding an optical connector described in the fifth through eighth embodiments, any type optical connector can be applicable.

Regarding an optical fiber cable described in the above embodiments, it may be a multi-mode type or a single-mode.

Utility in the Industry Field

As described above, the present invention provides an optical active connector where in additional space for providing new LAN device/tools is unnecessary, the LAN devices can be connected only by optical fibers without changing an interface of a LAN devices already established and heat is effectively radiated in the connector, electromagnetic wave is prevented from radiating to an exterior of the connector and a battery supply can be simplified.

What is claimed is:

1. An optical active connector plug for LAN, comprising:
 a modular plug type electric connector interface having eight wires/contacts wherein electrode terminals are formed to transmit/receive an electric signal;
 a receptacle for said optical interface;
 an optical sub module having an optical element, said optical sub module capable of converting said electric signal and an optical signal;
 an optical connector inserted into said receptacle;
 an electrical circuit electrically connected to said module, for driving, amplifying, and identifying said signals; and
 a connector case for installing a wiring board on which said optical sub module and said electrical circuit are mounted, said connector case including a metal piece covering said optical sub-module and a part of said wiring board, connected to a heat radiation via-hole provided on one surface of said wiring board, and an uneven surface partly provided on another surface of said metal piece opposite to said surface.

2. An optical active connector plug for LAN, comprising:
 a modular plug type electric connector interface having eight wires/contacts wherein electrode terminals are formed to transmit/receive an electric signal;
 a pigtail for an optical interface;
 an optical sub module having an optical element, said optical sub module capable of converting said electric signal and an optical signal;
 an electrical circuit electrically connected to said module, said electrical circuit being capable of driving, amplifying, and identifying said signals; and
 a connector case for installing a wiring board on which said optical sub module and said electrical circuit are mounted, said connector case including a metal piece covering said optical sub-module and a part of said wiring board, connected to a heat radiation via-hole provided on one surface of said wiring board, and an uneven surface partly provided on another surface of said metal piece opposite to said surface.

3. The optical active connector plug for LAN as claimed in claim 1, wherein said wiring board includes at least one battery supply pin, a front end of which protruding from said connector case.

4. The optical active connector plug for LAN as claimed in claim 1, wherein battery power is supplied to said electrical circuits through said electrode terminal.

5. The optical active connector plug for LAN as claimed in claim 3, wherein a battery supply element is fixed at a portion surrounding said connector port and said battery supply pin, and said battery supply element supplies energy power by adapting said electric interface.

6. The optical active connector plug for LAN as claimed in claim 3, wherein said interface is a connector port adapted through a battery supply board and said battery supply pin makes contact with said battery supply element by adapting said electrical interface to supply energy power and said battery supply board is mechanically held.

* * * * *